(12) United States Patent
Takenouchi

(10) Patent No.: US 8,924,698 B2
(45) Date of Patent: Dec. 30, 2014

(54) GROUPING COOPERATION SYSTEM, GROUPING COOPERATION METHOD, AND GROUPING PROCESSING FLOW MANAGEMENT PROGRAM

(75) Inventor: Takao Takenouchi, Minato-ku (JP)

(73) Assignee: NEC Corporation, Tokyo (JP)

( * ) Notice: Subject to any disclaimer, the term of this patent is extended or adjusted under 35 U.S.C. 154(b) by 173 days.

(21) Appl. No.: 13/518,685

(22) PCT Filed: Dec. 1, 2010

(86) PCT No.: PCT/JP2010/007003
§ 371 (c)(1),
(2), (4) Date: Jun. 22, 2012

(87) PCT Pub. No.: WO2011/077645
PCT Pub. Date: Jun. 30, 2011

(65) Prior Publication Data
US 2012/0266253 A1    Oct. 18, 2012

(30) Foreign Application Priority Data

Dec. 25, 2009  (JP) ................................ 2009-294761

(51) Int. Cl.
| | | |
|---|---|---|
| *G06F 9/00* | (2006.01) | |
| *G06F 9/24* | (2006.01) | |
| *G06F 7/00* | (2006.01) | |
| *G06F 17/30* | (2006.01) | |
| *G06F 15/16* | (2006.01) | |
| *G06Q 30/02* | (2012.01) | |

(52) U.S. Cl.
CPC ...... *G06Q 30/0204* (2013.01); *G06F 17/30463* (2013.01); *G06F 17/30469* (2013.01); *G06Q 30/02* (2013.01)
USPC ............... 713/1; 707/713; 707/716; 707/718; 709/205

(58) Field of Classification Search
CPC   G06Q 10/10; G06Q 10/0631; G06Q 10/0633
USPC ........................ 713/1; 709/205; 707/713–719
See application file for complete search history.

(56) References Cited

U.S. PATENT DOCUMENTS 5,848,408 A * 12/1998 Jakobsson et al. ............ 707/714
6,728,947 B1 * 4/2004 Bengston ...................... 717/103
(Continued)

FOREIGN PATENT DOCUMENTS

| JP | 2003-115011 A | 4/2003 |
|---|---|---|
| JP | 2004-102766 A | 4/2004 |

(Continued)

OTHER PUBLICATIONS

"Overview of Liberty ID-WSF Web Service Framework Version 1.0," [online], 2004, Liberty Alliance, [Searched on Oct. 15, 2009], the Internet <URL: http://projectliberty.org/jp/resources/LAP-ID-WSF-archtecture-overview-v1.0-JP.pdf>.

*Primary Examiner* — Tae Kim
(74) *Attorney, Agent, or Firm* — Sughrue Mion, PLLC

(57) ABSTRACT

A grouping apparatus manages user information, and executes grouping processing for extracting a subset which matches a predetermined condition from a set of users. A flow control apparatus transmits a set of users to one of a plurality of grouping apparatuses, and transmits a condition used in grouping processing to each of the plurality of grouping apparatuses. One of the grouping apparatuses transmits, to another grouping apparatus, a first subset which is extracted by executing grouping processing on the set transmitted from the flow control apparatus. The other grouping apparatus extracts a second subset by executing grouping processing on the first subset transmitted from the one of the grouping apparatuses.

9 Claims, 19 Drawing Sheets

(56) References Cited

U.S. PATENT DOCUMENTS

| | | | |
|---|---|---|---|
| 7,194,452 B2* | 3/2007 | Galindo-Legaria et al. | 1/1 |
| 7,343,368 B2* | 3/2008 | Cornpropst et al. | 1/1 |
| 7,406,499 B2* | 7/2008 | Singh et al. | 709/205 |
| 7,765,166 B2* | 7/2010 | Beringer et al. | 705/319 |
| 7,991,787 B2* | 8/2011 | Klein | 707/780 |
| 8,190,598 B2* | 5/2012 | Al-Omari et al. | 707/718 |
| 8,417,762 B2* | 4/2013 | Branson et al. | 709/201 |
| 2004/0128156 A1* | 7/2004 | Beringer et al. | 705/1 |
| 2005/0021382 A1* | 1/2005 | Margison | 705/8 |
| 2005/0216560 A1* | 9/2005 | Pohja et al. | 709/205 |
| 2005/0283786 A1* | 12/2005 | Dettinger et al. | 718/104 |
| 2006/0059122 A1* | 3/2006 | Klein | 707/3 |
| 2006/0229924 A1* | 10/2006 | Aron et al. | 705/8 |
| 2006/0294056 A1* | 12/2006 | Cornpropst et al. | 707/2 |
| 2008/0077667 A1* | 3/2008 | Hwang et al. | 709/205 |
| 2008/0256167 A1* | 10/2008 | Branson et al. | 709/201 |
| 2009/0037370 A1* | 2/2009 | Mishra et al. | 707/2 |
| 2009/0182814 A1* | 7/2009 | Tapolcai et al. | 709/205 |
| 2009/0240546 A1* | 9/2009 | Sato | 705/8 |
| 2010/0228760 A1* | 9/2010 | Chen et al. | 707/759 |
| 2011/0066649 A1* | 3/2011 | Berlyant et al. | 707/770 |
| 2011/0137702 A1* | 6/2011 | Hodges et al. | 705/7.27 |
| 2011/0145037 A1* | 6/2011 | Domashchenko et al. | 705/7.27 |
| 2011/0246445 A1* | 10/2011 | Mishra et al. | 707/713 |

FOREIGN PATENT DOCUMENTS

| | | |
|---|---|---|
| JP | 2004-164141 A | 6/2004 |
| JP | 2004-318391 A | 11/2004 |

* cited by examiner

FIG. 2

| USER INFORMATION STORAGE UNIT | |
|---|---|
| USER IDENTIFIER | AGE |
| userA | 10 |
| userB | 15 |
| userC | 19 |
| userD | 25 |
| userE | 30 |
| | |
| | |

FIG. 3

| USER INFORMATION STORAGE UNIT | |
|---|---|
| USER IDENTIFIER | POSITION |
| userA | TAMACHI |
| userB | TAMACHI |
| userC | SHIBUYA |
| userD | TAMACHI |
| userE | SHINJUKU |
| | |
| | |

FIG. 4

| SEARCH INFORMATION STORAGE UNIT | |
|---|---|
| GROUPING APPARATUS ID | TYPE OF USER INFORMATION HELD |
| GROUPING APPARATUS A | AGE |
| GROUPING APPARATUS B | POSITION |
| GROUPING APPARATUS C | PREFERENCE |
|  |  |
|  |  |

FIG. 5

| PRIORITY STORAGE UNIT | |
|---|---|
| GROUPING APPARATUS ID | ORDER OF PRIORITY |
| GROUPING APPARATUS A | 1 |
| GROUPING APPARATUS B | 2 |
| GROUPING APPARATUS C | 3 |
|  |  |
|  |  |

FIG. 10

| SEARCH INFORMATION STORAGE UNIT | | |
|---|---|---|
| TYPE OF USER INFORMATION HELD | GROUPING APPARATUS ID | ORDER OF PRIORITY |
| AGE | GROUPING APPARATUS D | 1 |
|  | GROUPING APPARATUS A | 2 |
| POSITION | GROUPING APPARATUS B | 1 |
| PREFERENCE | GROUPING APPARATUS C | 1 |
|  |  |  |
|  |  |  |

FIG. 11

| PROVIDER STORAGE UNIT | | |
|---|---|---|
| TYPE OF USER INFORMATION HELD | GROUPING APPARATUS ID | USER IDENTIFICATION OF SUBSCRIBING USER |
| AGE | GROUPING APPARATUS A | userA,userC,userD |
|  | GROUPING APPARATUS E | userB,userE |
| POSITION | GROUPING APPARATUS B | userA,userB,userC, userD,userE |
| PREFERENCE | GROUPING APPARATUS C | userA,userB,userC, userD,userE |
|  |  |  |
|  |  |  |

FIG. 13

| PRIORITY STORAGE UNIT | |
|---|---|
| TYPE OF USER INFORMATION | ORDER OF PRIORITY |
| AGE | 1 |
| POSITION | 2 |
| PREFERENCE | 3 |
|  |  |
|  |  |

FIG. 15

| USER SURVIVAL RATE INFORMATION STORAGE UNIT ||
|---|---|
| GROUPING APPARATUS ID | USER SURVIVAL RATE |
| GROUPING APPARATUS A | 0.5 |
| GROUPING APPARATUS B | 0.01 |
|  |  |
|  |  |
|  |  |

FIG. 17

| PROVIDER STORAGE UNIT | |
|---|---|
| TYPE OF USER INFORMATION HELD | GROUPING APPARATUS ID |
| AGE | GROUPING APPARATUS A |
| | GROUPING APPARATUS B |
| | GROUPING APPARATUS C |
| POSITION | GROUPING APPARATUS D |
| | GROUPING APPARATUS E |
| ANNUAL INCOME | GROUPING APPARATUS F |
| | |
| | |

FIG. 20

| FLOW DETERMINING RULE STORAGE UNIT | |
|---|---|
| INDEX CALCULATION FORMULA | WEIGHT |
| 1/<USER REMAINING RATE> | 2 |
| <INFORMATION LEAKAGE RISK VALUE> × (-1) | 1 |
| | |
| | |

FIG. 21

| INFORMATION LEAKAGE RISK STORAGE UNIT | |
|---|---|
| TYPE OF USER INFORMATION | INFORMATION LEAKAGE RISK |
| AGE | 2 |
| SEX | 1 |
| ANNUAL INCOME | 100 |
| | |

FIG. 22

| USER REMAINING RATE INFORMATION STORAGE UNIT | |
|---|---|
| TYPE OF USER INFORMATION | USER REMAINING RATE |
| AGE | 0.1 |
| SEX | 0.5 |
| ANNUAL INCOME | 0.05 |
| | |

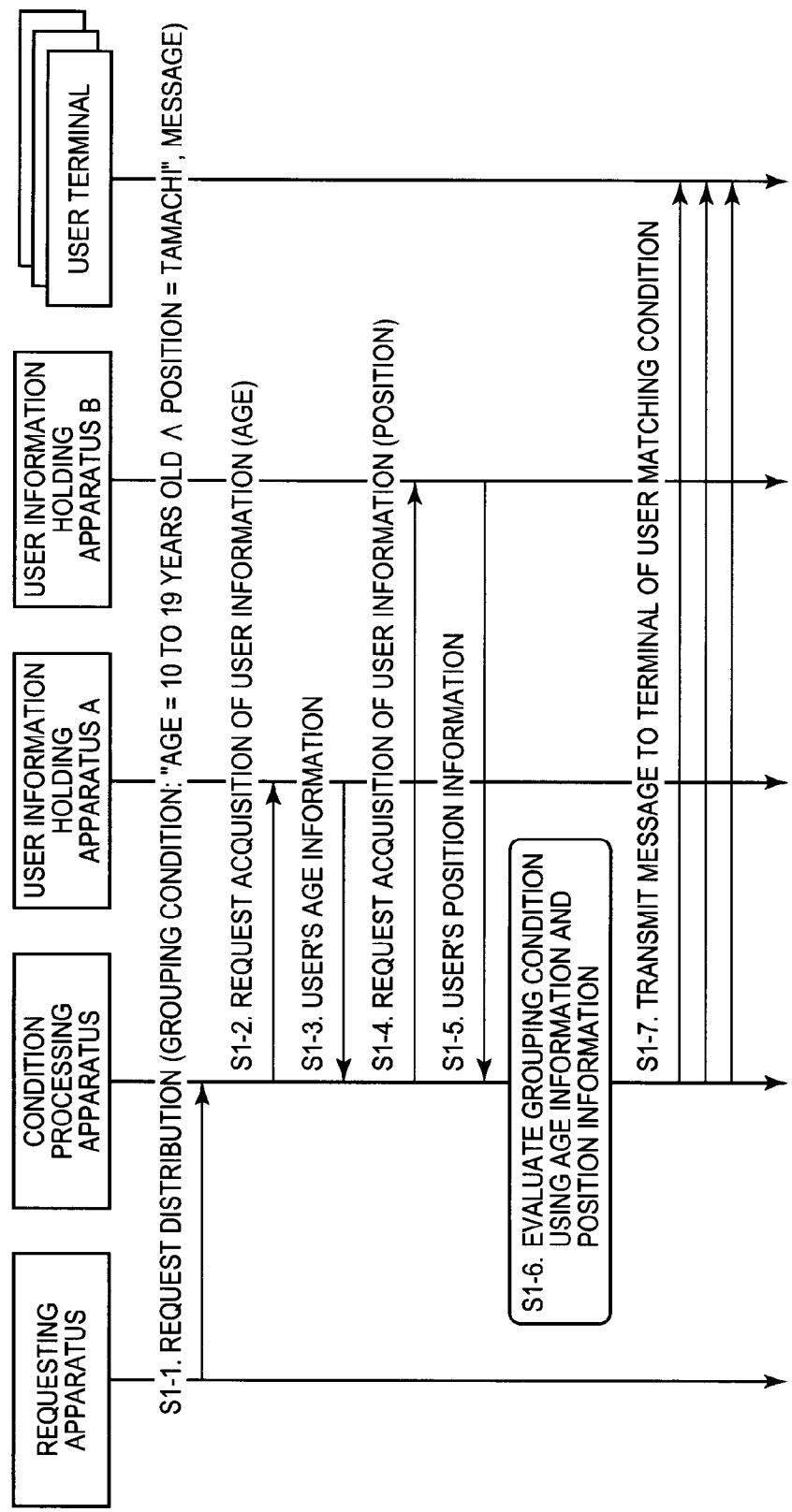

GROUPING COOPERATION SYSTEM, GROUPING COOPERATION METHOD, AND GROUPING PROCESSING FLOW MANAGEMENT PROGRAM

CROSS REFERENCE TO RELATED APPLICATION

This application is a National Stage of International Application No. PCT/JP2010/007003 filed Dec. 1, 2010, claiming priority based on Japanese Patent Application No. 2009-294761 filed Dec. 25, 2009, the contents of all of which are incorporated herein by reference in their entirety.

TECHNICAL FIELD

The present invention relates to a grouping cooperation system, a grouping cooperation method, and a grouping processing flow management program for performing grouping processing on the basis of user information, and more particularly, relates to a grouping cooperation system, a grouping cooperation method, and a grouping processing flow management program capable of performing grouping processing in cooperation, without leaking user information stored in a plurality of apparatuses to the outside.

BACKGROUND ART

There is a case where user information registered to a plurality of providers is used to extract users which match a predetermined condition, and an advertisement message is sent to the extracted users. FIG. 24 is a block diagram illustrating an example of configuration of a generally-available grouping system which extracts users on the basis of user information managed by a plurality of providers.

In this case, the grouping processing is a processing for adopting a set of a plurality of users as a population, and extracting a set of users which matches a certain condition from the population.

The grouping system illustrated in FIG. 24 includes a requesting apparatus 1100, a condition processing apparatus 1200, a user information holding apparatus A 1300, and a user information holding apparatus B 1400, and is connected to a user terminal 1500 owned by each user via a communication network. It should be noted that the user information holding apparatus A 1300 and the user information holding apparatus B 1400 are managed by different providers.

The user information holding apparatus A 1300 holds age information of users and the user information holding apparatus B 1400 holds position information of users. The requesting apparatus 1100 transmits a request to the condition processing apparatus 1200 to transmit an advertisement message to users according to ages and positions. Thereafter, the condition processing apparatus 1200 groups users, using the age information of the users which is user information held in the user information holding apparatus A 1300 and the position information of the users which is user information held in the user information holding apparatus B 1400, and distributes an advertisement message to the user terminals 1500.

FIG. 25 is a sequence diagram illustrating an operation of a generally-available grouping system for extracting users.

First, the requesting apparatus 1100 transmits, to the condition processing apparatus 1200, a grouping condition for requesting grouping of users whose "age is 10 to 19 years old" and "position is Tamachi" and the content of an advertisement message which is to be sent to that group, and requests advertisement distribution (step S1-1).

The condition processing apparatus 1200 requests the user information holding apparatus A 1300 to obtain each piece of the age information of the users in order to evaluate the received grouping condition (step S1-2). The user information holding apparatus A 1300 transmits each piece of age information of the users to the condition processing apparatus 1200 (step S1-3). Likewise, the condition processing apparatus 1200 requests the user information holding apparatus B 1400 to obtain each piece of the position information of the users (step S1-4). The condition processing apparatus 1200 receives the position information transmitted from the user information holding apparatus B 1400 (step S1-5).

Then, the condition processing apparatus 1200 uses the received age information and the received position information to evaluate the grouping condition, and groups users whose "age is 10 to 19 years old" and "position is Tamachi" (step S1-6). In other words, the condition processing apparatus 1200 extracts the users. Then, the condition processing apparatus 1200 transmits the advertisement message to the user terminals 1500 of the grouped users (step S1-7).

In the generally-available grouping system using user information possessed by a plurality of providers, the user information possessed by each provider is given to a provider that performs grouping process, and that provider performs the grouping process. In such case, a strong relationship of trust is built by, for example, making a contract between providers in advance, so as to prevent leakage to the outside or abuse of user information, which is exchanged with each other.

Liberty Alliance Web Service Framework described in Non Patent Literature 1 (hereinafter referred to as Liberty-WSF) is known as another method for giving user information of a certain provider to another provider, among providers trusted by each other.

In the Liberty-WSF, there are a Web Service Provider having user information and a Web Service Consumer obtaining the user information, and the Liberty-WSF has such mechanism that the Web Service Consumer gives the user's authentication information to the Web Service Provider, so that the user information possessed by the Web Service Provider is transmitted to the Web Service Consumer.

Patent Literature 1 describes a system for extracting users based on registered user information and transmitting advertisement information to the extracted users.

CITATION LIST

Patent Literature

PLT 1: Japanese Patent Application Laid-Open No. 2004-164141 (Paragraphs 0037 to 0094, FIG. 1)

Non Patent Literature

NPL 1: "Overview of Liberty ID-WSF Web Service Framework Version 1.0", [online], 2004, Liberty Alliance, [Searched on Oct. 15, 2009], the Internet <URL: http://projectliberty.org/jp/resources/LAP-ID-WSF-archtecture-overview-v1.0-JP.pdf>

SUMMARY OF INVENTION

Technical Problem

However, the first problem of the generally-available grouping system explained above lies in that, between providers of which relationship of trust is not so strong, giving user information managed by a certain provider to another provider may lead to leakage of user information, and may result in abuse of user information.

When relationship of trust is built by, for example, making a contract between providers, giving user information to another provider is less likely to cause problems. However, when a provider wants to cooperate with many providers, it is cumbersome to make a contract with each of many providers. Sometimes, a small provider is less trusted than a large provider, and in such a case, it is difficult to make a contract.

If user information is given to another provider without making any contract, the user information may leak to the outside, or may be abused.

When advertisement information is transmitted using user information possessed by a plurality of providers in the system described in Patent Literature 1, the plurality of providers have to provide user information to a provider transmitting advertisement information, and this may result in leakage of the user information to the outside, or abuse of the user information.

Accordingly, it is an object of the present invention to provide a grouping cooperation system, a grouping cooperation method, and a grouping processing flow management program capable of performing grouping processing in cooperation, without leaking user information stored by a plurality of apparatuses to the outside.

Solution to Problem

A grouping cooperation system according to the present invention is characterized by including: a plurality of grouping apparatuses, wherein the grouping apparatus manages user information which is information about users, and executes grouping processing for extracting a subset, which matches a predetermined condition, from a set of users; a flow control apparatus which transmits a set of users, which is to be subjected to the grouping processing, to one of the plurality of grouping apparatuses, and transmits a condition used in the grouping processing to each of the plurality of grouping apparatuses, wherein the one of the grouping apparatuses transmits, to another grouping apparatus, a first subset extracted by executing the grouping processing on the set transmitted from the flow control apparatus, the other grouping apparatus extracts a second subset by executing the grouping processing on the first subset transmitted from the one of the grouping apparatuses, wherein the flow control apparatus includes: a flow request receiving unit which receives a set of users and a basic grouping condition constituted by a plurality of conditions for extracting users from the set of users; a condition decomposing unit which decomposes the plurality of conditions, which constitutes the basic grouping condition which are input to the flow request receiving unit, into individual grouping conditions, which are conditions corresponding to types of user information; a processing flow determining unit which determines a sequence the grouping processing is executed by the plurality of grouping apparatuses; and a processing flow transmitting unit which transmits a set of users to one of the grouping apparatuses on the basis of the sequence determined by the processing flow determining unit, and transmits, to each of the grouping apparatuses, the individual grouping condition decomposed by the condition decomposing unit and destination information indicating a destination of a subset which is a result of grouping processing performed by each of the grouping apparatuses based on the sequence determined by the processing flow determining unit, and wherein the grouping apparatus includes: a receiving unit which receives the individual grouping condition and the destination information transmitted from the flow control apparatus and the set or subset of users transmitted from the flow control apparatus or another grouping apparatus; a condition evaluation unit which extracts, on the basis of the managed user information, a subset including users that matches the individual grouping condition received by the receiving unit from the users included in the set or subset of users received by the receiving unit; and an evaluation result transmitting unit which transmits the subset extracted by the condition evaluation unit to the destination indicated by the destination information received by the receiving unit.

A grouping cooperation method according to the present invention is characterized by including: causing a flow control apparatus to receive a set of users and a basic grouping condition constituted by a plurality of conditions for extracting users from the set of users; causing the flow control apparatus to decompose the plurality of conditions, which constitutes the basic grouping condition which are received, into individual grouping conditions, which are conditions corresponding to types of user information; causing the flow control apparatus to determine a sequence in which grouping processing is executed by the plurality of grouping apparatuses executing the grouping processing for extracting users, which match the individual grouping condition, from a set of users; causing the flow control apparatus to transmit a set of users to one of the grouping apparatuses on the basis of the sequence determined, and transmits, to each of the grouping apparatuses, the individual grouping condition and destination information indicating a destination of a subset which is a result of grouping processing performed by each of the grouping apparatuses based on the sequence; causing one of the grouping apparatuses to receive the individual grouping condition, the destination information, and the set of users, which are transmitted; causing one of the grouping apparatuses to extract, on the basis of the managed user information, a subset including users that matches the individual grouping condition from the users included in the set of users received; and causing one of the grouping apparatuses to transmit the extracted subset to the destination indicated by the destination information received.

A grouping processing flow management program according to the present invention is characterized by causing a computer to execute: condition decomposing processing for decomposing a plurality of conditions, which constitutes a basic grouping condition constituted by a plurality of conditions for extracting users from a set of users, into individual grouping conditions, which are conditions corresponding to types of user information; processing flow determining processing for determining a sequence in which grouping processing is executed by a plurality of grouping apparatuses executing the grouping processing for extracting users, which match the individual grouping condition, from a set of users; and processing flow transmitting processing for transmitting a set of users to one of the grouping apparatuses on the basis of the sequence determined in the processing flow determining, and transmitting, to each of the grouping apparatuses, the individual grouping condition decomposed in the condition decomposing processing and destination information indicating a destination of a subset which is a result of grouping processing performed by each of the grouping apparatuses based on the sequence determined in the processing flow determining processing.

Advantageous Effects of Invention

According to the present invention, the risk of leakage of user information can be reduced. This is because grouping processing can be performed without transmitting user information managed by a plurality of different grouping apparatuses to another grouping apparatus. In other words, it is not necessary to give the user information to the another grouping apparatus, and therefore, this reduces the risk of leakage of the user information, which is caused by illegal activity committed by providers of grouping apparatuses in transmission/reception path of the user information or at the destination of transmission of the user information.

An apparatus that inputs a set of user identifiers and a condition serving as input to grouping apparatuses is different from an apparatus that receives a set of user identifiers serving as output from the grouping apparatuses. Therefore, it is difficult to infer user information from the input to the grouping apparatuses and the output from the grouping apparatuses.

BRIEF DESCRIPTION OF DRAWINGS

FIG. 2 is an explanatory diagram illustrating an example of information stored in a user information storage unit of a grouping apparatus A.

FIG. 3 is an explanatory diagram illustrating an example of information stored in a user information storage unit of a grouping apparatus B.

FIG. 4 is an explanatory diagram illustrating an example of information stored in a search information storage unit.

FIG. 5 is an explanatory diagram illustrating an example of information stored in a priority storage unit.

FIG. 10 is an explanatory diagram illustrating an example of a grouping apparatus ID, the type of user information, and the order of priority of the grouping apparatus ID, which are stored in association with each other.

FIG. 11 is an explanatory diagram illustrating an example of a grouping apparatus ID, the type of user information, a list of user identifiers of users managed by the grouping apparatus, which are stored in association with each other.

FIG. 13 is an explanatory diagram illustrating an example of the type of user information and the order of priority, which are stored in association with each other.

FIG. 15 is an explanatory diagram illustrating an example of information saved in a user survival rate information storage unit.

FIG. 17 is an explanatory diagram illustrating an example of information stored in a provider storage unit.

FIG. 20 is an explanatory diagram illustrating an example of information stored in a flow determining rule storage unit.

FIG. 21 is an explanatory diagram illustrating an example of information stored in an information leakage risk storage unit.

FIG. 22 is an explanatory diagram illustrating an example of information stored in a user remaining rate information storage unit.

FIG. 25 is a sequence diagram illustrating operation of the generally-available grouping system for extracting users.

DESCRIPTION OF EMBODIMENTS

First Exemplary Embodiment

The first exemplary embodiment of the present invention will be explained. In the present exemplary embodiment, it is assumed that there are five users including a user A, user B, user C, user D, user E, and an advertiser who wants to send an advertisement. It is assumed that the advertiser sends an advertisement message to users whose "age is 10 to 19 years old" and "current position is Tamachi" among these users.

Figure 1:
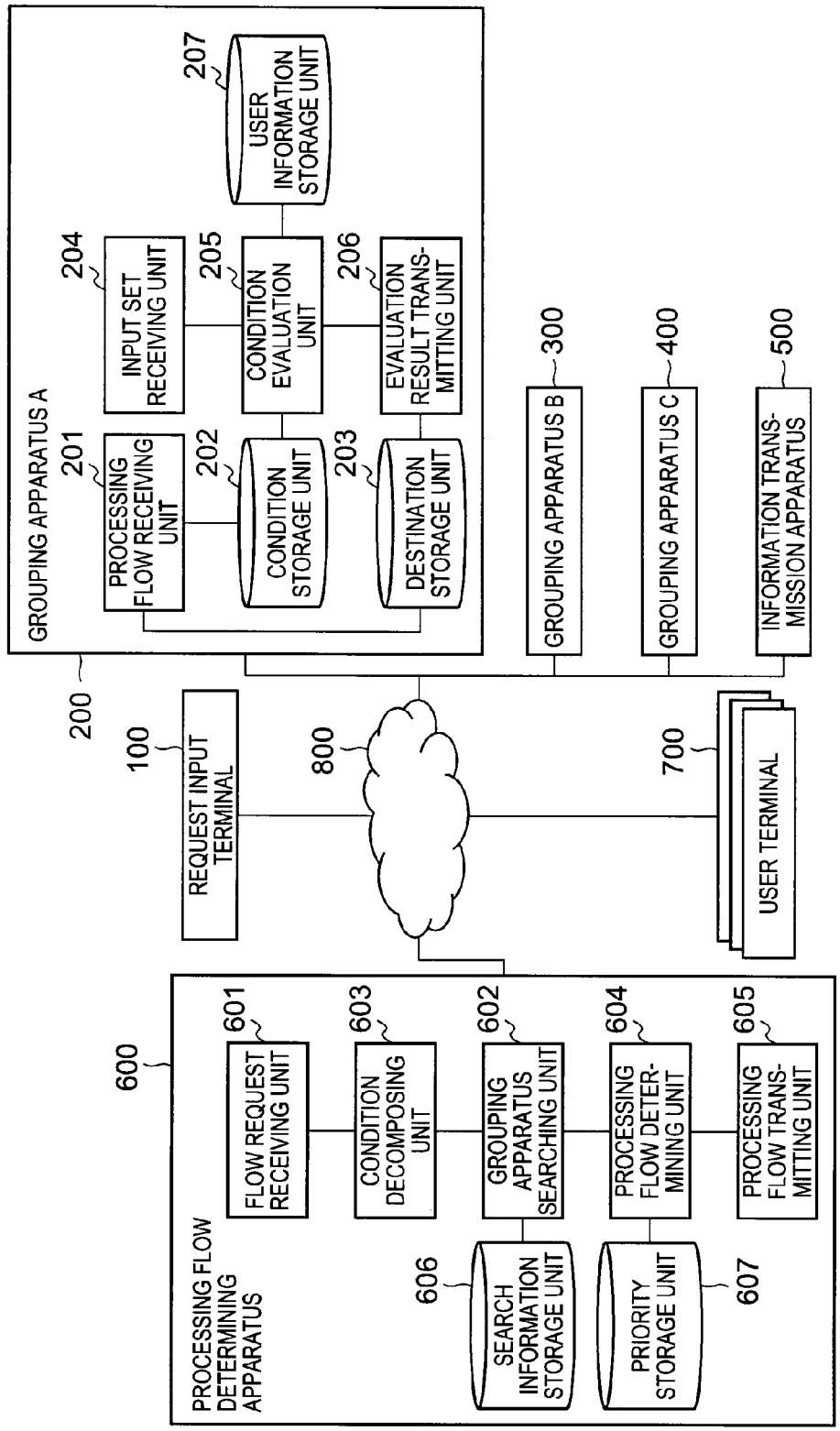
FIG. 1 is a block diagram illustrating an example of configuration of a first exemplary embodiment of a grouping cooperation system according to the present invention.

FIG. 1 is a block diagram illustrating an example of configuration of the first exemplary embodiment of the grouping cooperation system according to the present invention. As illustrated in FIG. 1, the grouping cooperation system according to the first exemplary embodiment of the present invention includes a processing flow determining apparatus 600, a grouping apparatus A 200, and a grouping apparatus B 300.

As illustrated in FIG. 1, the processing flow determining apparatus 600, the grouping apparatus A 200, and the grouping apparatus B 300 are connected to a communication network 800. A request input terminal 100, a grouping apparatus C 400, an information transmission apparatus 500, and a user terminal 700 are connected to the communication network 800.

Each apparatus as described above is a computer operating according to program control (central processing apparatus; processor; data processing apparatus).

It is assumed that the grouping apparatus A 200 is managed by the provider A, and the grouping apparatus B 300 is managed by the provider B. It is assumed that the information transmission apparatus 500 is managed by a communication service provider. It is assumed that each of the user A, the user B, the user C, the user D, and the user E owns one user terminal 700.

In the present exemplary embodiment, the advertiser uses the request input terminal 100 to perform operation for transmitting the advertisement message. More specifically, for example, the advertiser inputs, to the request input terminal 100, a basic grouping condition indicating what kind of users to whom the advertiser wants to send the advertisement message. In the grouping cooperation system according to the present invention, the sequence of processing of each grouping apparatus is determined in accordance with the basic grouping condition which is input to the request input terminal 100.

As illustrated in FIG. 1, the grouping apparatus A 200 includes a processing flow receiving unit 201, a condition storage unit 202, an input set receiving unit 204, a condition evaluation unit 205, a user information storage unit 207, a destination storage unit 203, and an evaluation result transmitting unit 206.

The processing flow receiving unit 201 includes a function of receiving an individual grouping condition and a destination information as an input, a function of storing the individual grouping condition to the condition storage unit 202, a function of storing the destination information to the destination storage unit 203.

It should be noted that the basic grouping condition includes a plurality of conditions for extracting users on the basis of user information. The individual grouping condition is a condition obtained by dividing the plurality of conditions included in the basic grouping condition in accordance with the type of user information. The destination information is information indicating a transmission destination of a processing result of the grouping apparatuses.

The condition storage unit 202 has a function of storing the individual grouping condition. The destination storage unit 203 has a function of storing the destination information. The input set receiving unit 204 has a function of receiving a set of user identifiers, and a function of inputting the set to the condition evaluation unit 205 and requesting processing. It should be noted that the user identifier is information for identifying each user.

The user information storage unit 207 has a function of associating and storing user identifiers and information about users. In the present exemplary embodiment, the user information storage unit 207 of the grouping apparatus A 200 stores the age information of the users.

FIG. 2 is an explanatory diagram illustrating an example of information stored in the user information storage unit 207 of the grouping apparatus A 200. As illustrated in FIG. 2, the user information storage unit 207 stores the user identifier of each user and the age of each user, which are associated with each other. More specifically, as illustrated in FIG. 2, the user identifier "user A" is associated with age "10" and stored, the user identifier "user B" is associated with age "15" and stored, the user identifier "user C" is associated with age "19" and stored, the user identifier "user D" is associated with age "25" and stored, and the user identifier "user E" is associated with age "30" and stored.

The condition evaluation unit 202 includes a function of receiving a set of user identifiers, a function of obtaining an individual grouping condition from the condition storage unit 202, a function of obtaining user information of users indicated by the user identifiers received as input from the user information storage unit 207, a function using the user information to extract a set of users matching the individual grouping condition from the users indicated by the user identifiers received as input, and a function of inputting the set of user identifiers of the extracted users into the evaluation result transmitting unit 206.

The evaluation result transmitting unit 206 includes a function of receiving a set of user identifiers, a function of obtaining destination information from the destination storage unit 203, and a function of transmitting a set of user identifiers to a destination indicated by the destination information.

The grouping apparatus B 300 has the same configuration as that of the grouping apparatus A 200, and has the same functions as those of the grouping apparatus A 200. In the present exemplary embodiment, the user information storage unit of the grouping apparatus B 300 saves the position information of the users.

FIG. 3 is an explanatory diagram illustrating an example of information stored in the user information storage unit of the grouping apparatus B 300. As illustrated in FIG. 3, the user information storage unit of the grouping apparatus B 300 saves the user identifier of each user and the position of each user, which are associated with each other. More specifically, as illustrated in FIG. 3, the user identifier "user A" and the position "Tamachi" are associated with each other and stored, the user identifier "user B" and the position "Tamachi" are associated with each other and stored, the user identifier "user C" and the position "Shibuya" are associated with each other and stored, the user identifier "user D" and the position "Tamachi" are associated with each other and stored, and the user identifier "user E" and the position "Shinjuku" are associated with each other and stored.

The information transmission apparatus 500 has a function of receiving a set of user identifiers from the grouping apparatus B 300, a function of receiving a message content from the request input terminal 100, and a function of transmitting a message to the user terminal 700 indicated by the user identifier.

The user terminal 700 has a function of displaying a received message from the information transmission apparatus 500. More specifically, the user terminal 700 has a function of receiving a message transmitted from the information transmission apparatus 500, and displaying the message on display means (not shown).

The processing flow determining apparatus 600 includes a flow request receiving unit 601, a condition decomposing unit 603, a grouping apparatus searching unit 602, a search information storage unit 606, a processing flow determining unit 604, a priority storage unit 607, and a processing flow transmitting unit 605.

The flow request receiving unit 601 has a function of receiving, from the request input terminal 100, a basic grouping condition and a set of user identifiers serving as a population of an advertisement distribution destination. The flow request receiving unit 601 also has a function of inputting, into the condition decomposing unit 603, the received basic grouping condition and the received set of user identifiers.

The condition decomposing unit 603 has a function of receiving the basic grouping condition, and decomposing the basic grouping condition into individual grouping conditions which are to be transmitted to the grouping apparatus A 200 or the grouping apparatus B 300. The condition decomposing unit 603 also has a function of inputting, into the grouping apparatus searching unit 602, the set of user identifiers and the plurality of decomposed individual grouping conditions.

The search information storage unit 606 has a function of associating and storing a grouping apparatus ID, i.e., an identifier indicated by each grouping apparatus, and the type of user information managed by the grouping apparatus indicated by the grouping apparatus ID.

FIG. 4 is an explanatory diagram illustrating an example of information stored in the search information storage unit 606. In the example as illustrated in FIG. 4, the grouping apparatus ID "grouping apparatus A" and the type of user information "age" are associated with each other and stored, the grouping apparatus ID "grouping apparatus B" and the type of user information "position" are associated with each other and stored, and the grouping apparatus ID "grouping apparatus C" and the type of user information "preference" are associated with each other and stored.

The grouping apparatus searching unit 602 includes a function of receiving a set of user identifiers and a plurality of individual grouping conditions, a function of looking up information stored in the search information storage unit 606 to search the grouping apparatus ID holding user information required to evaluate each individual grouping condition. The grouping apparatus searching unit 602 also has a function of inputting, into the processing flow determining unit 604, the set of user identifiers, a plurality of individual grouping conditions, and the extracted grouping apparatus ID.

The priority storage unit 607 has a function of associating and storing the grouping apparatus ID and the order of priority.

FIG. 5 is an explanatory diagram illustrating an example of information stored in the priority storage unit 607. In the example as illustrated in FIG. 5, the grouping apparatus ID "grouping apparatus A" and the order of priority "1" are associated with each other and stored, the grouping apparatus ID "grouping apparatus B" and the order of priority "2" are associated with each other and stored, and the grouping apparatus ID "grouping apparatus C" and the order of priority "3" are associated with each other and stored.

The processing flow determining unit 604 includes a function of receiving a population, i.e., a set of user identifiers, a plurality of individual grouping conditions, and a grouping apparatus ID indicating a grouping apparatus capable of evaluating the individual grouping conditions. The processing flow determining unit 604 also has a function of looking up information stored in the priority storage unit 607, obtaining the order of priority of the grouping apparatus IDs, and determining the sequence of grouping apparatuses executing processing, in accordance with the order of priority.

The processing flow determining unit 604 also has a function of generating processing flow information including the grouping apparatus ID to which a request for performing processing is given and destination information indicating a destination to which a processing result of the grouping apparatus is transmitted, in accordance with the sequence of processing thus determined, and inputting the generated processing flow information and the population into the processing flow transmitting unit 605.

The processing flow transmitting unit 605 has a function of receiving the processing flow information and the population, and transmitting a set of user identifiers and destination information to the grouping apparatus indicated by the grouping apparatus ID included in the processing flow information. The processing flow transmitting unit 605 also has a function of sending the population to the first grouping apparatus in the processing flow, in accordance with the sequence determined by the processing flow determining unit 604.

Figure 6:
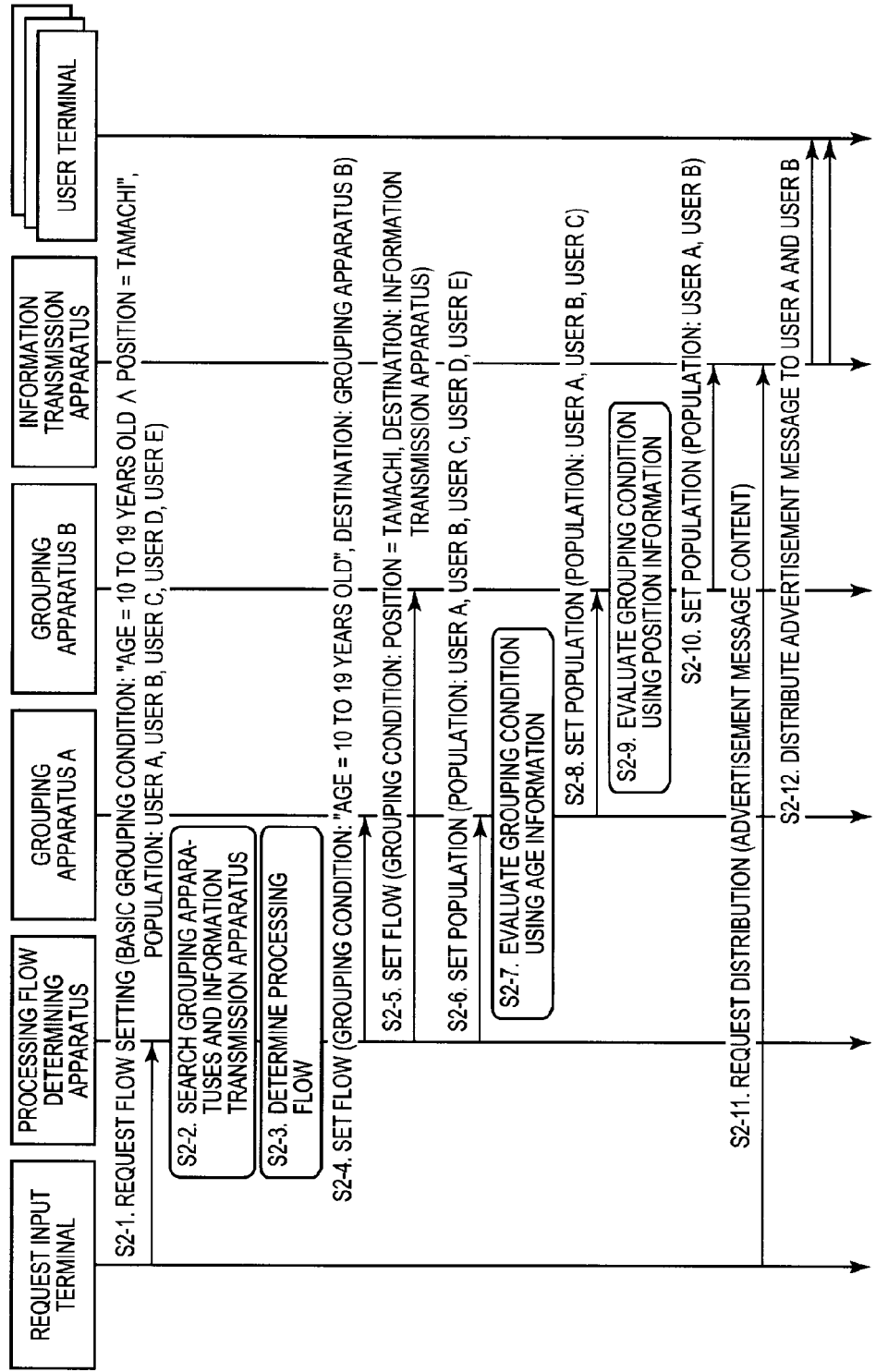
FIG. 6 is a sequence diagram illustrating a flow of overall processing of the grouping cooperation system according to the first exemplary embodiment of the present invention.
Figure 7:
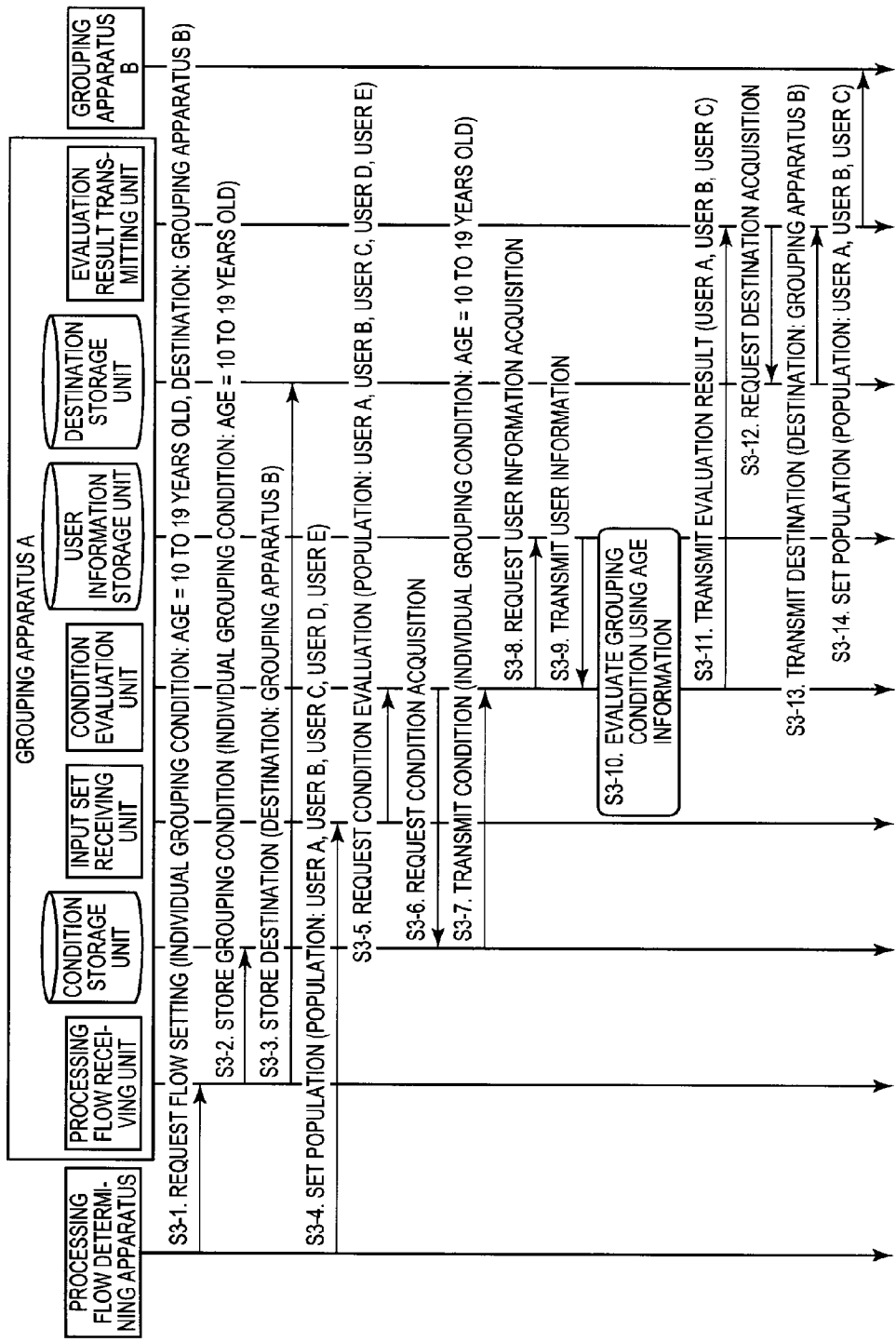
FIG. 7 is a sequence diagram illustrating a flow of processing of the grouping apparatus A.
Figure 8:
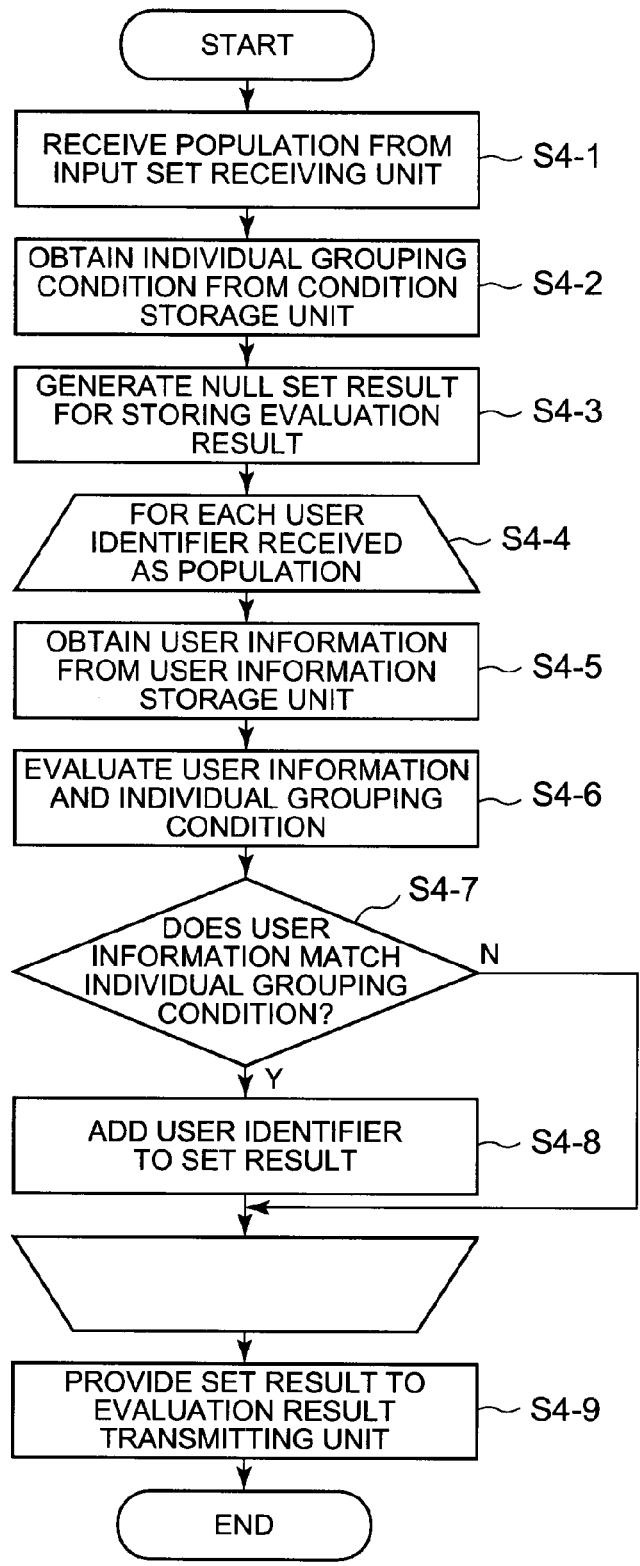
FIG. 8 is a flowchart illustrating operation of a condition evaluation unit of the grouping apparatus A.
Figure 9:
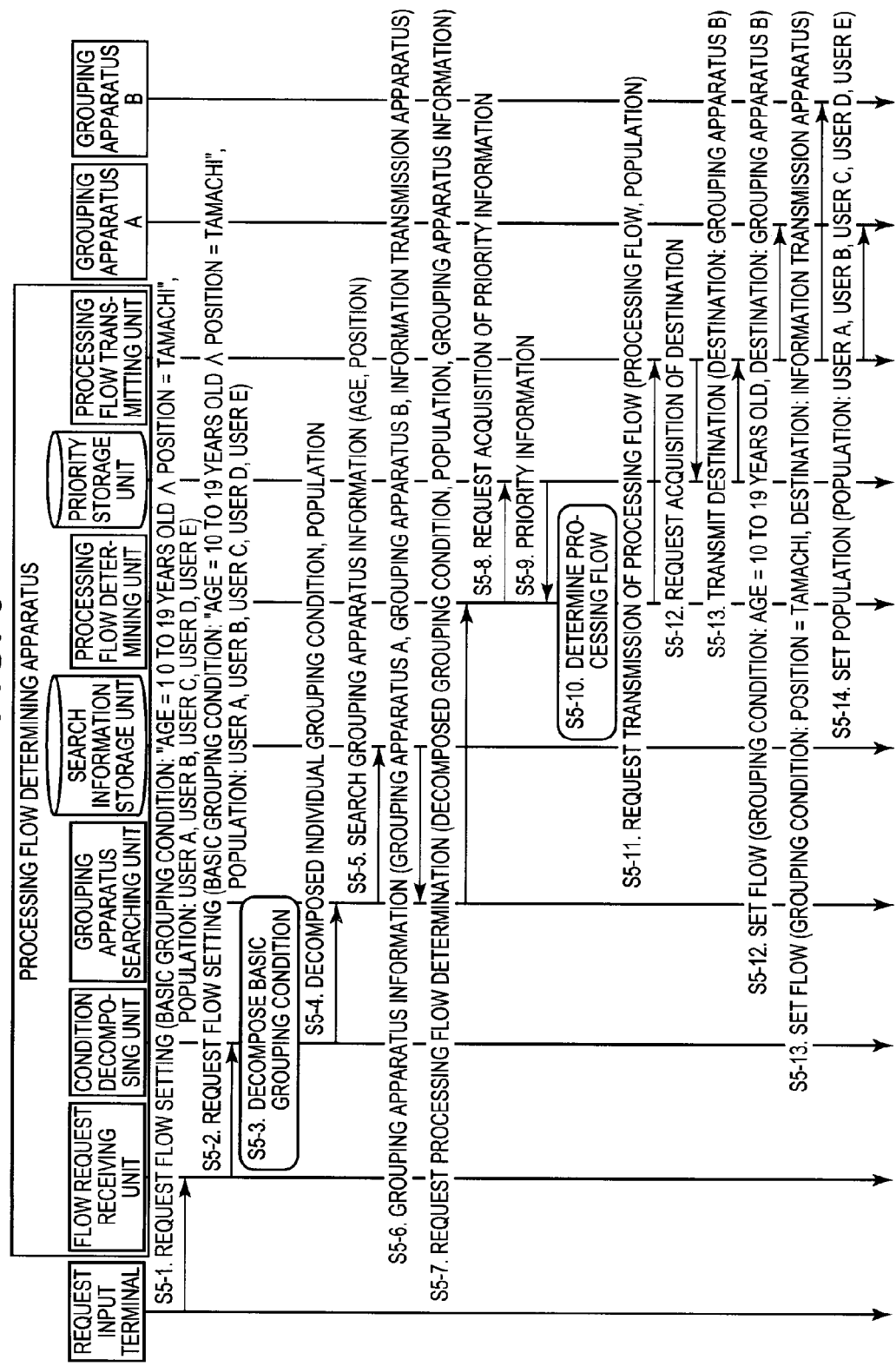
FIG. 9 is a sequence diagram illustrating a flow of processing of a processing flow determining apparatus.

Subsequently, operation of the grouping cooperation system according to the first exemplary embodiment of the present invention will be explained with reference to drawings. FIG. 6 is a sequence diagram illustrating a flow of overall processing of the grouping cooperation system according to the first exemplary embodiment of the present invention. FIG. 7 is a sequence diagram illustrating a flow of processing of the grouping apparatus A 200. FIG. 8 is a flowchart illustrating operation of a condition evaluation unit 205 of the grouping apparatus A 200. FIG. 9 is a sequence diagram illustrating a flow of processing of the processing flow determining apparatus 600.

First, the advertiser inputs, into the request input terminal 100, the basic grouping condition and the set of user identifiers serving as the population of the advertisement distribution target. In this example, it is assumed that "age=10 to 19 years old^position=Tamachi" is input as the basic grouping condition, and (user A, user B, user C, user D, user E) is input as the population.

The request input terminal 100 transmits the received basic grouping condition and the received population to the flow request receiving unit 601 of the processing flow determining apparatus 600 (steps S2-1, S5-1).

The flow request receiving unit 601 of the processing flow determining apparatus 600 receives the basic grouping condition and the population, and inputs the basic grouping condition and the population into the condition decomposing unit 603 (step S5-2).

The condition decomposing unit 603 receives the basic grouping condition and the population, and decomposes the basic grouping condition to make the basic grouping condition into a plurality of individual grouping conditions (step S5-3). In this example, it is assumed that the basic grouping condition, "age=10 to 19 years old^ position=Tamachi" is decomposed with AND condition. In other words, "age=10 to 19 years old ^ position=Tamachi" is decomposed into two individual grouping conditions, i.e., "age=10 to 19 years old" and "position=Tamachi".

Then, the condition decomposing unit 603 inputs the decomposed individual grouping conditions and the population into the grouping apparatus searching unit 602 (step S5-4).

The grouping apparatus searching unit 602 receives the individual grouping condition and the population. Then, the grouping apparatus searching unit 602 looks up information stored in the search information storage unit 606, and searches the grouping apparatus ID holding user information required to evaluate each individual grouping condition (steps S2-2, S5-5, S5-6). In this example, the individual grouping conditions are "age=10 to 19 years old" and "position=Tamachi", and the information as illustrated in FIG. 4 as an example is stored in the search information storage unit 606, and therefore, as a result of search, the grouping apparatus A having information about age and the grouping apparatus B having information about position are extracted.

The grouping apparatus searching unit 602 inputs, into the processing flow determining unit 604, a combination of a list of individual grouping conditions and the extracted grouping apparatus IDs and information about the population (step S5-7). In this example, the grouping apparatus searching unit 602 inputs, into the processing flow determining unit 604, information of "a list of a combination of a grouping apparatus ID and an individual grouping condition={(grouping apparatus A, "age=10 to 19 years old"), (grouping apparatus B, "position=Tamachi")}, population: (userA, userB, userC, userD, userE)".

The processing flow determining unit 604 receives the grouping apparatus IDs, the individual grouping conditions, and the population. Then, the processing flow determining unit 604 looks up information stored in the priority storage unit 607, and obtains the order of priority of the grouping apparatus IDs (steps S5-8, S5-9). In this example, the information as illustrated in FIG. 5 as an example is stored in the priority storage unit 607, and therefore, information indicating that the order of priority of the grouping apparatus A is 1, and the order of priority of the grouping apparatus B is 2 is obtained.

Then, the processing flow determining unit 604 determines the sequence of grouping apparatuses executing processing in accordance with the obtained order of priority (steps S2-3, S5-10). In this example, the order of priority of the grouping apparatus A is higher than the order of priority of the grouping apparatus B, and therefore, the processing flow determining unit 604 determines the sequence as follows: the grouping apparatus A→grouping apparatus B.

Then, the processing flow determining unit 604 generates, in accordance with the determined sequence of processing, processing flow information including a grouping apparatus ID to which a request for performing processing is given, an individual grouping condition which the grouping apparatus receives as the request, and destination information to which a result of the grouping apparatus is transmitted. Then, the generated processing flow information and the population are input to the processing flow transmitting unit 605 (step S5-11).

In this example, the processing flow information indicating {(grouping apparatus A, "age=10 to 19 years old", grouping apparatus B), (grouping apparatus B, "position=Tamachi", information transmission apparatus)}, and the population indicating (user A, user B, user C, user D, user E), are input.

The processing flow transmitting unit 605 receives the processing flow information and the population, and transmits the individual grouping condition and the destination information to the grouping apparatus indicated by the processing flow information (steps S2-4, S2-5, S3-1, S5-12, S5-13). In this example, the processing flow transmitting unit 605 transmits the individual grouping condition indicating "age=10 to 19 years old" and the destination information indicating the grouping apparatus B to the grouping apparatus A 200. In addition, the processing flow transmitting unit 605 transmits the individual grouping condition indicating "position=Tamachi" and the destination information indicating the information transmission apparatus to the grouping apparatus B 300.

The processing flow receiving unit 201 of the grouping apparatus A 200 receives the individual grouping condition and the destination information, saves the individual grouping condition to the condition storage unit 202, and stores the destination information to the destination storage unit 203 (steps S3-2, S3-3). In this example, the grouping apparatus A 200 receives the individual grouping condition indicating "age=10 to 19 years old" and the destination information indicating the grouping apparatus B. The grouping apparatus B 300 also receives the individual grouping condition indicating "position=Tamachi" and the destination information indicating the information transmission apparatus.

Then, the processing flow transmitting unit 605 sends the population to the grouping apparatus indicated at the first of the processing flow (steps S2-6, S3-4, S5-14). In this example, the population (user A, user B, user C, user D, user E) is sent to the grouping apparatus A 200.

The input set receiving unit 204 of the grouping apparatus A 200 receives a list of user identifiers, i.e., the population transmitted by the processing flow transmitting unit 605, and inputs the received list of user identifiers into the condition evaluation unit 205 (step S3-5).

The condition evaluation unit 205 receives the list of user identifiers (step S4-1). Then, the condition evaluation unit 205 obtains the individual grouping condition from the condition storage unit 202 (steps S3-6, S3-7, S4-2).

Subsequently, the condition evaluation unit 205 generates a null set for storing an evaluation result (step S4-3). In this example, the null set is referred to as a set RESULT.

The condition evaluation unit 205 performs processing of steps S4-5, S4-6, S4-7, S4-8 as illustrated in FIG. 8 on each user identifier received (step S4-4). In this example, the processing is performed on user identifiers, i.e., user A, user B, user C, user D, and user E. The processing of steps S4-5, S4-6, S4-7, S4-8 will be explained using user A as an example.

The condition evaluation unit 205 obtains user information from the user information storage unit 207 (steps S3-8, S3-9, S4-5). For example, the user information about the user A is obtained from the user information storage unit 207 storing the information as illustrated in FIG. 2 for example, whereby information indicating "age is 10 years old" can be obtained.

The condition evaluation unit 205 evaluates the individual grouping condition using the obtained user information (S3-10, S4-6). It should be noted that "evaluating the individual grouping condition using the obtained user information" means making a determination as to whether the user information matches the individual grouping condition or not. In this example, the individual grouping condition is "age=10 to 19 years old", and the user information about the user A is "age is 10 years old". Therefore, the user information of the user A matches the individual grouping condition.

If the user information matches the individual grouping condition, the user identifier is added to the set RESULT (steps S4-7, S4-8). In this example, the user A is added to the set RESULT.

The processing of steps S4-5, S4-6, S4-7, S4-8 as described above is performed for each user identifier. In this example, the processing is performed for the user identifiers, i.e., user A, user B, user C, user D, and user E. In this example, the user A is 10 years old, the user B is 15 years old, the user C is 19 years old, the user D is 25 years old, and the user E is 30 years old. Therefore, the user A, the user B, and the user C match the individual grouping condition "age=10 to 19 years old". Therefore, the set RESULT becomes (user A, user B, user C).

Subsequently, the condition evaluation unit 205 evaluates the individual grouping condition to input the set RESULT, which is the list of user identifiers that matches the individual grouping condition, into the evaluation result transmitting unit 206 (steps S3-11, S4-9). In this example, (user A, user B, user C) is sent. It should be noted that the set RESULT corresponds to a first subset which is extracted from a set of users by executing the grouping processing.

The evaluation result transmitting unit 206 receives the list of user identifiers, i.e., the set RESULT. Then, the evaluation result transmitting unit 206 obtains the destination information from the destination storage unit 203 (steps S3-12, S3-13). In this example, the destination information indicating the grouping apparatus B is obtained.

The evaluation result transmitting unit 206 transmits the list of user identifiers, which is obtained by evaluating the individual grouping condition and is determined to match the individual grouping condition, to the destination indicated by the destination information (steps S2-8, S3-14). In this example, the evaluation result transmitting unit 206 transmits (user A, user B, user C) to the grouping apparatus B 300.

The input set receiving unit of the grouping apparatus B 300 receives the list of user identifiers, and evaluates the individual grouping condition, like the condition evaluation unit 205 of the grouping apparatus A 200 (step S2-9).

In this example, the list of user identifiers received by the input set receiving unit of the grouping apparatus B 300 includes user A, user B, and user C. The individual grouping condition indicating "position=Tamachi", which is transmitted in the processing of step S2-5, is stored in the condition storage unit of the grouping apparatus B. As illustrated in FIG. 3, for example, the information indicating that the user A is in Tamachi, the user B is in Tamachi, the user C is in Shibuya, the user D is in Tamachi, and the user E is in Shinjuku is stored in the user information storage unit of the grouping apparatus B. Therefore, among the user A, the user B, and the user C, the user A and the user B whose "position is Tamachi" match the individual grouping condition. It should be noted that the set including the user A and the user B as elements corresponds to a second subset which is extracted by performing the grouping processing on the first subset.

Then, the grouping apparatus B 300 transmits the list of user identifiers (user A, user B) to the information transmission apparatus 500 in accordance with the destination information "information transmission apparatus" stored in the destination storage unit (step S2-10).

The advertiser inputs an advertisement message, which the advertiser wants to send to the destination, into the request input terminal 100. The request input terminal 100 sends the content of the advertisement message to the information transmission apparatus 500 (step S2-11).

The information transmission apparatus 500 receives the content of the advertisement message, and sends the advertisement message to the user terminals 700 of the users indicated by the user identifiers included in the list received in the processing of step S2-10 (step S2-12). In this example, the advertisement message is sent to the user terminals 700 of the user A and the user B.

The present exemplary embodiment is configured such that the grouping apparatus A 200 of the provider A having the age information cooperates with the grouping apparatus B 300 of the provider B having the position information, and one apparatus performs the grouping process and sends the grouping result to a subsequent grouping apparatus. Therefore, the grouping process can be performed using a plurality of pieces of user information without leaking user information to the outside of the grouping apparatus.

In addition, the processing flow determining apparatus 600 sends an appropriate grouping request to each grouping apparatus, on the basis of the condition indicating what kind of users the advertiser wants to send an advertisement, which is input to the request input apparatus 100. Therefore, there is an advantage in that it is possible to reduce the burden of the advertiser when the advertiser considers to which grouping apparatus a grouping request is to be sent.

In the present exemplary embodiment, when user information within the grouping apparatus is changed, the grouping condition is evaluated on every such occasion. For example, when the age of the user C is changed from 19 years old to 20 years old in the grouping apparatus A 200, for example, the user information storage unit 207 performs the processing of step S3-9 again on the basis of an instruction given by a control unit (not shown) of the grouping apparatus A 200. In the example explained above, in the processing of step S3-9, information indicating that the user A is 10 years old, the user B is 15 years old, the user C is 20 years old, the user D is 25 years old, and the user E is 30 years old is sent. Accordingly, the user A and the user B match the individual grouping condition "age=10 to 19 years old". Therefore, the set RESULT becomes (user A, user B). Then, processing of step S3-10 and subsequent steps is performed.

In the present exemplary embodiment, the set of user identifiers given to each grouping apparatus as input is considered to be a population of calculation of sets, and a set of user identifiers in the population matching an individual grouping condition is extracted. In other words, in the present exemplary embodiment, where a set of user identifiers given to a grouping apparatus as input is denoted as α, and a set of user identifiers determined to match a individual grouping condition and extracted by the grouping apparatus is denoted as β, the following relationship holds: $\alpha \supset \beta$.

However, in the present invention, the set of user identifiers given to the grouping apparatus as input may not be considered as a population for calculation of set. For example, when an advertisement is to be sent to "friends of users who bought a game", a completely different set may be extracted from the set of user identifiers given to the grouping apparatus as input.

For example, it is assumed that a friend of the user A is a user X, a friend of the user B is a user Y, and the individual grouping condition is "friends of users included in the set of user identifiers given as input". In this case, where the set of user identifiers given to the grouping apparatus as input is users who bought the game (user A, user B), the set of user identifiers determined to match the individual grouping condition and extracted by the grouping apparatus is (user X, user Y).

Then, by sending an advertisement message to this (user X, user Y), an advertisement can be sent to the "friends of users who bought the game". As described above, the individual grouping condition of the grouping apparatus according to the present invention may include a condition for extracting another set of user identifiers from a certain set of user identifiers.

In the present exemplary embodiment, the destination information stored in the destination storage unit 203 is an identifier of a grouping apparatus. However, the destination information may be an identifier representing a provider. For example, when there is a plurality of grouping apparatuses holding the same user information within a certain provider in order to disperse the load of processing, the destination information is preferably the identifier indicating the provider. In such case, a grouping result may be transmitted to any one of the apparatuses managed by the provider, and the grouping apparatus actually performs processing within the provider may be determined.

In the present exemplary embodiment, the grouping apparatus ID and the type of user information are stored in association with each other in the search information storage unit 606. Alternatively, the grouping apparatus ID, the type of user information, and the order of priority of the grouping apparatus ID may be stored in association with each other.

FIG. 10 is an explanatory diagram illustrating an example of a grouping apparatus ID, the type of user information, and the order of priority of the grouping apparatus ID, which are stored in association with each other. As illustrated in FIG. 10, when there is a plurality of grouping apparatuses having age information, processing is performed as follows. When the grouping apparatus searching unit 602 searches grouping apparatuses in the processing of steps S5-5, S5-6, the grouping apparatus D and the grouping apparatus A 200 are extracted as grouping apparatuses having the age information.

When a plurality of grouping apparatuses are extracted, it is necessary to further choose any one of the grouping apparatuses, but the information about the order of priority stored in the search information storage unit 606 may be used as criteria for making the selection. For example, when the order of priority as illustrated in FIG. 10 is stored, the grouping apparatus D is higher than the grouping apparatus A 200 in terms of the order of priority, and accordingly, the grouping apparatus searching unit 602 chooses the grouping apparatus D.

In the present exemplary embodiment, the grouping apparatus ID and the type of user information are stored in association with each other in the search information storage unit 606. Alternatively, the grouping apparatus ID, the type of user information, and a list of user identifiers of users managed by the grouping apparatus ID may be stored in association with each other.

FIG. 11 is an explanatory diagram illustrating an example of a grouping apparatus ID, the type of user information, a list of user identifiers of users managed by the grouping apparatus, which are stored in association with each other. In the example as illustrated in FIG. 11, there are a grouping apparatus A and a grouping apparatus E which are grouping apparatuses having age information, wherein the grouping apparatus A 200 holds user information about (user A, user C, user D), and the grouping apparatus E holds user information about (user B, user E).

In such a case, in the processing of steps S5-5, S5-6, the grouping apparatus searching unit 602 extracts the grouping apparatus A 200 having age information and the grouping apparatus B 300 having position information for (user A, user C, user D), and extracts the grouping apparatus E having age information and the grouping apparatus B 300 having position information for (user B, user E).

Figure 12:
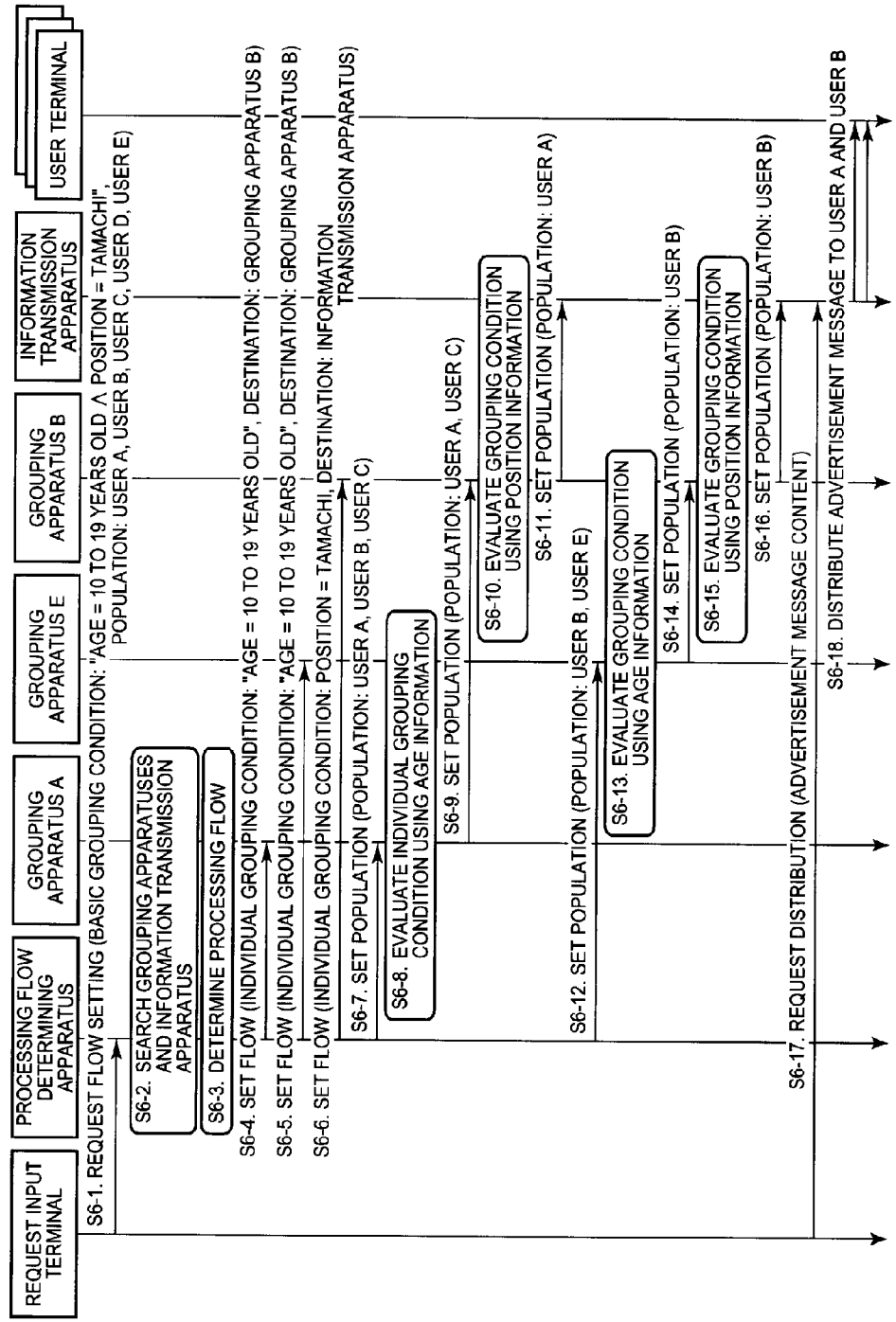
FIG. 12 is a sequence diagram illustrating operation where a different population is given according to a grouping apparatus.

When a different grouping apparatus is extracted for each user as described above, a different population is given to each grouping apparatus. FIG. 12 is a sequence diagram illustrating operation where a different population is given according to a grouping apparatus. In an example illustrated in FIG. 12, the processing of steps S6-1 to S6-3 is the same as the processing of steps S2-1 to S2-3 as illustrated in FIG. 6.

Processing of steps S6-4 to S6-6 as illustrated in FIG. 12 which is processing corresponding to steps S2-4, S2-5 as illustrated in FIG. 6 will be explained.

The processing flow determining apparatus 600 sets the grouping apparatus A 200 as follows: the grouping condition is set to "age=10 to 19 years old", and the destination is set to "grouping apparatus B" (step S6-4). Accordingly, the grouping apparatus A 200 transmits a set of results of grouping processing to the grouping apparatus B 300. The processing flow determining apparatus 600 sets the grouping apparatus E as follows: the grouping condition is set to "age=10 to 19 years old", and the destination is set to "grouping apparatus B" (step S6-5). Accordingly, the grouping apparatus E transmits a set of results of grouping processing to the grouping apparatus B 300. The processing flow determining apparatus 600 sets the grouping apparatus B 300 as follows: the grouping condition is set to "position=Tamachi", and the destination is set to "information transmission apparatus" (step S6-6).

Processing of steps S6-7, S6-12 as illustrated in FIG. 12 which is processing corresponding to step S2-6 as illustrated in FIG. 6 will be explained.

The processing flow determining apparatus 600 transmits a population (user A, user C, user D) to the grouping apparatus A 200 (step S6-7). The, processing flow determining apparatus 600 transmits a population (user B, user E) to the grouping apparatus E (step S6-12).

In the example as illustrated in FIG. 12, the processing of steps S6-8 to S6-11 and the processing of steps S6-13 to S6-16 are the same as the processing of steps S2-7 to S2-10 as illustrated in FIG. 6. In the example as illustrated in FIG. 12, the processing of steps S6-17, S6-18 is the same as the processing of steps S2-11, S2-12 as illustrated in FIG. 6.

By performing the processing as illustrated in FIG. 12 for example, both of the grouping apparatus A 200 and the grouping apparatus E are used for the grouping of ages, and the grouping apparatus B 300 is used for the grouping of positions.

The priority storage unit 607 may store information in which the order of priority of a grouping apparatus which is likely to decrease the number of identifiers included in a set of users is set at a high level. The present invention is characterized in that the number of identifiers included in a set of users is reduced by the processing of the first grouping apparatus, whereby the number of users processed by a subsequent grouping apparatus is reduced, which can reduce the load of processing of a grouping apparatus subsequent thereto. For this reason, the order of priority of a grouping apparatus which is likely to be able to greatly decrease the number of identifiers included in a set of users is set at a high level, and therefore, there is an advantage in that the load of processing of a grouping apparatus subsequent thereto can be reduced more greatly.

Alternatively, the priority storage unit 607 may store information in which the order of priority of a grouping apparatus which is likely to cause less damage even if user information is leaked is set at a high level. In the present invention, when a set of user identifiers serving as a population of grouping process, a set of user identifiers obtained as a result of the grouping process, and an individual grouping condition are leaked, then it is possible to some extent infer user information from such information.

For example, when the population is (user A, user B), the individual grouping condition is "sex=male", and the set of user identifiers obtained a result of the grouping process is (user B), then it is possible to infer that the user B is male and the user A is female.

When the individual grouping condition is a condition that is likely to be abused when the information is leaked, e.g., "the annual income is a hundred million yen or more", then it is possible to be known that users obtained as a result of the grouping process has "an income of a hundred million yen or more" if the individual grouping condition is leaked.

As explained as examples above, in the present invention, it is possible to infer the population and the user information about users obtained as a result of grouping process from the population, the individual grouping condition, and the result of grouping process. Therefore, it is effective to, at first, make the population reduced by the grouping apparatus which causes less damage even if the user information is leaked, so that the risk of leakage of the user information can be reduced. Therefore, the order of priority of the grouping apparatus which is likely to cause less damage even if the user information is leaked may be set at a high level.

Still alternatively, the priority storage unit 607 may store information in which the order of priority of a grouping apparatus which holds user information that is changed less frequently is set at a high level. In the present invention, when user information managed by a grouping apparatus of a higher level which performs processing first is frequently changed, a set of user identifiers given to a grouping apparatus of a lower level which thereafter performs processing accordingly is also frequently changed. As described above, when user information of the higher level is frequently changed, the grouping apparatus of the lower level also has to perform the processing, and accordingly, the load of processing increases. Therefore, the grouping apparatus which holds user information that is changed less frequently is preferably set at the high level.

In the present exemplary embodiment, the priority storage unit 607 stores the grouping apparatus ID and the order of priority, which are stored in association with each other. Alternatively, the type of user information and the order of priority may be stored in association with each other. FIG. 13 is an explanatory diagram illustrating an example of the type of user information and the order of priority, which are stored in association with each other. In the example as illustrated in FIG. 13, the type of user information "age" and the order of priority "1" are associated with each other, the type of user information "position" and the order of priority "2" are associated with each other, and the type of user information "preference" and the order of priority "3" are associated with each other.

When the priority storage unit 607 stores information as illustrated in FIG. 13 for example, the processing flow determining unit 604 determines the sequence of processing of grouping apparatuses as follows. When the sequence of processing of grouping apparatuses is determined in steps S5-8, S5-9, S5-10 as illustrated in FIG. 9, the processing flow determining unit 604 determines the sequence of processing of grouping apparatuses in accordance with the order of priority of the types of user information possessed by the grouping apparatuses.

It should be noted that the following processing may be executed in place of the processing of steps S5-8, S5-9, S5-10 as illustrated in FIG. 9.

In other words, the processing flow determining unit 604 receives the grouping apparatus ID, the individual grouping condition, and the population from the grouping apparatus searching unit 602. Then, the processing flow determining unit 604 looks up the information stored in the priority storage unit 607, and obtains the order of priority of the types of user information. More specifically, for example, the processing flow determining unit 604 receives information including "{(grouping apparatus A, "age=10 to 19 years old"), (grouping apparatus B, "position=Tamachi")} which are grouping apparatus IDs and individual grouping conditions, and a population: (user A, user B, user C, user D, user E). It is assumed that the priority storage unit 607 stores the information as illustrated in FIG. 13 for example. In this case, the processing flow determining unit 604 obtains information indicating that the order of priority of age is 1 and the order of priority of position is 2.

Then, as processing in place of the processing of step S5-10, the processing flow determining unit 604 determines the sequence of processing of grouping apparatuses in accordance with the obtained order of priority. In this case, the order of priority of age is higher than the order of priority of position, and therefore, the sequence is determined as follows: the grouping apparatus A 200 having the age information→the grouping apparatus B 300 having the position information. Therefore, the sequence of grouping process can be changed in accordance with the type of user information.

In the present exemplary embodiment, the grouping apparatus manages only one type of user information. Alternatively, the grouping apparatus may manage a plurality of types of user information, and may process a plurality of grouping conditions.

In the present exemplary embodiment, the processing flow determining apparatus 600 transmits the individual grouping condition and the destination information to each grouping apparatus without relying on any other apparatus. Alternatively, the processing flow determining apparatus 600 may be configured to transmit the individual grouping condition and the destination information to each grouping apparatus by way of another apparatus. For example, when, like the present exemplary embodiment, the sequence of processing is as follows: the grouping apparatus A 200→the grouping apparatus B 300, the individual grouping condition and the destination information which are to be given to the grouping apparatus B 300 may be transmitted by way of the grouping apparatus A 200.

In such configuration, in order to prevent the provider of the grouping apparatus A 200 from viewing the individual grouping condition and the destination information, the processing flow determining apparatus 600 may encrypt and transmit such information using a private key shared by the grouping apparatus B 300 and the processing flow determining apparatus 600.

Processing will be explained where the processing flow determining apparatus 600 encrypts and transmits the individual grouping condition and the destination information. When the processing flow determining apparatus 600 encrypts and transmits the individual grouping condition and the destination information, the processing of steps S2-4, S2-5 as illustrated in FIG. 6 for example is replaced with the following processing.

In other words, the processing flow determining apparatus 600 encrypts the individual grouping condition and the destination information, which are to be transmitted to the grouping apparatus B 300, using a private key that is shared with the grouping apparatus B 300 in advance. In this case, it is assumed that the processing flow determining apparatus 600 is preparing to respectively transmit the individual grouping condition and the destination information as follows: ("age=10 to 19 years old", grouping apparatus B) is transmitted to the grouping apparatus A 200, and ("position=Tamachi", information transmission apparatus) is transmitted to the grouping apparatus B. The processing flow determining apparatus 600 encrypts ("position=Tamachi", information transmission apparatus) which is to be transmitted to the grouping apparatus B 300. It should be noted that the encrypted individual grouping condition and the encrypted destination information are denoted as encrypted (("position=Tamachi", information transmission apparatus)).

Subsequently, the processing flow determining apparatus 600 sends the grouping apparatus A 200 the encrypted individual grouping condition and the encrypted destination information, which are to be sent to the grouping apparatus B 300, and the individual grouping condition and the destination information, which are to be sent to the grouping apparatus A 200. More specifically, the processing flow determining apparatus 600 sends ("age=10 to 19 years old", grouping apparatus B) and encrypted (("position=Tamachi", information transmission apparatus)) to the grouping apparatus A 200.

Subsequently, the grouping apparatus A 200 stores the individual grouping condition and the destination information, which are addressed to the grouping apparatus A 200 (steps S3-2, S3-3 as illustrated in FIG. 7). Then, the grouping apparatus A 200 sends the encrypted individual grouping condition and the encrypted destination information, which are not addressed to the grouping apparatus A 200, to a grouping address indicated by the destination information addressed to the grouping apparatus A 200. More specifically, encrypted (("position=Tamachi", information transmission apparatus)) is transmitted to the grouping apparatus B 300.

The grouping apparatus B 300 decodes the encrypted individual grouping condition and the encrypted destination information, which have been received, using the private key that is shared with the processing flow determining apparatus 600 in advance. Then, the decoded individual grouping condition and the decoded destination information are stored (steps S3-2, S3-3 as illustrated in FIG. 7).

The processing flow determining unit 604 according to the present exemplary embodiment is configured to generate processing flow information including the destination information indicating one destination. Alternatively, the processing flow determining unit 604 according to the present exemplary embodiment may be configured to generate processing flow information including destination information indicating a plurality of destinations. For example, the processing flow determining unit 604 may be configured to generate processing flow information including destination information (grouping apparatus B, grouping apparatus C). Then, based on such destination information, the grouping apparatus A 200 transmits processing result not only to the grouping apparatus B 300, but also to the grouping apparatus B 300 and the grouping apparatus C400.

More specifically, for example, the grouping apparatus A 200 transmits the processing result, which is obtained by performing processing with the individual grouping condition indicating that "the position is Tamachi", to the grouping apparatus B 300 and the grouping apparatus C 400. The grouping apparatus B 300 further transmits the processing result, which is obtained by performing processing with the individual grouping condition indicating that "the age is 10 to 19 years old", to the information transmission apparatus 500. In addition, the grouping apparatus C 400 transmits the processing result, which is obtained by performing processing with the individual grouping condition indicating that "the sex is male", to the information transmission apparatus 500.

In such configuration, for example, a grouping condition including "OR" such as ("the position is Tamachi" or "the age is 10 to 19 years old" or "the sex is male") can be supported.

Second Exemplary Embodiment

Subsequently, the second exemplary embodiment of the present invention will be explained. In the first exemplary embodiment explained above, the processing flow is determined by the order of priority determined in advance. In contrast, in the present exemplary embodiment, instead of obtaining the determined order of priority, information according to how many users have been reduced in processing performed in the past by each grouping apparatus is obtained, and based on this information, the order of priority is determined, and a processing flow is determined.

Figure 14:
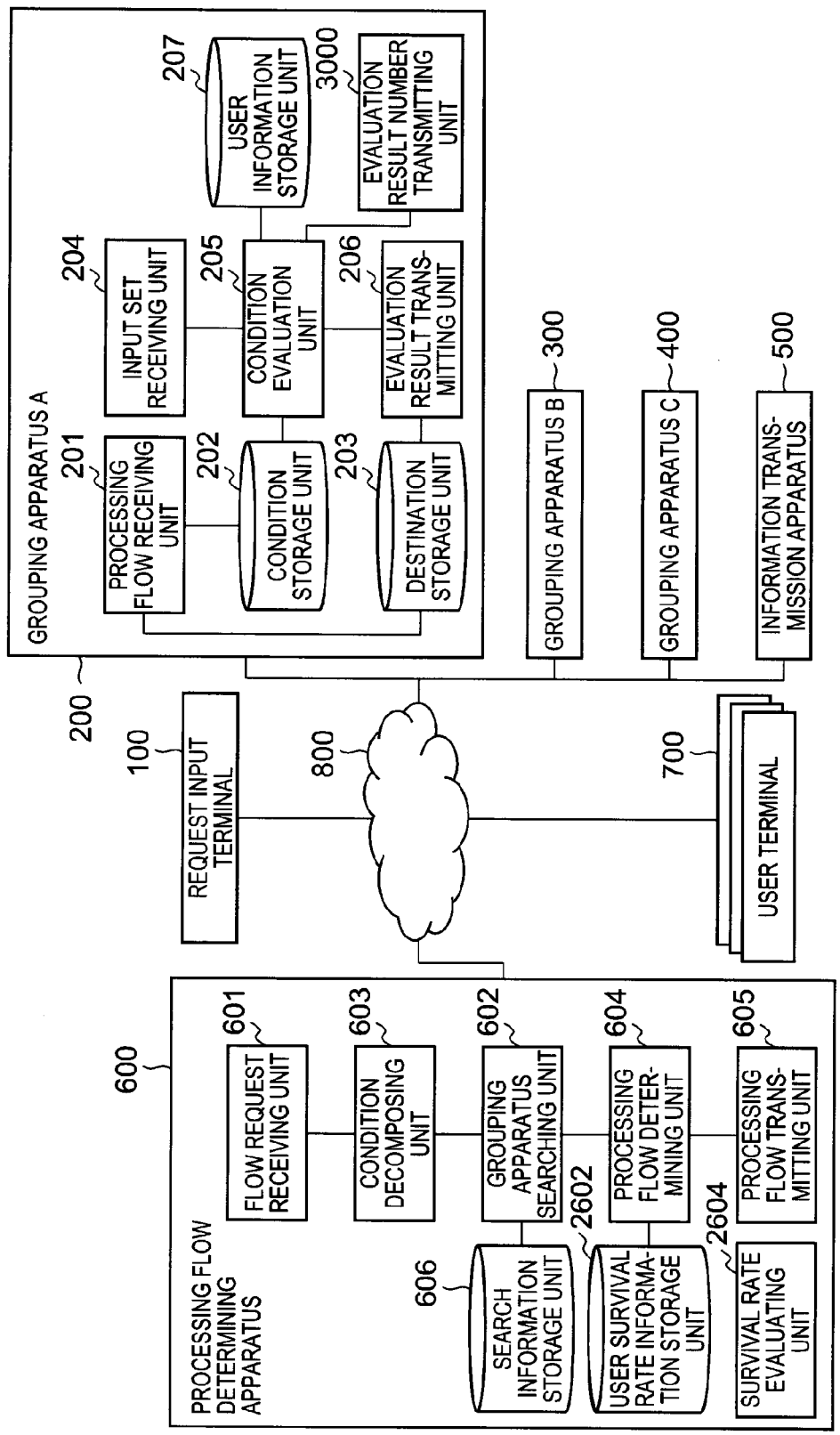
FIG. 14 is a block diagram illustrating an example of configuration of a second exemplary embodiment of a grouping cooperation system according to the present invention.

FIG. 14 is a block diagram illustrating an example of configuration of the second exemplary embodiment of a grouping cooperation system according to the present invention. As illustrated in FIG. 14, in the grouping cooperation system according to the second exemplary embodiment of the present invention, a processing flow determining apparatus 600 includes not only the constituent elements provided in the processing flow determining apparatus 600 according to the first exemplary embodiment as illustrated in FIG. 1 but also a user survival rate information storage unit 2602 and a survival rate evaluating unit 2604. In addition, a grouping apparatus A 200 includes an evaluation result number transmitting unit 3000.

The user survival rate information storage unit 2602 has a function of associating and storing a grouping apparatus ID and a user survival rate. The user survival rate is a ratio indicating how many users remain as a result of reducing user identifiers included in a set of users in processing performed in the past by a grouping apparatus indicated by a grouping apparatus ID. In other words, the user survival rate is a ratio of the number of users extracted based on an individual grouping condition by each grouping apparatus.

FIG. 15 is an explanatory diagram illustrating an example of information stored in the user survival rate information storage unit 2602. In the example as illustrated in FIG. 15, the user survival rate of the grouping apparatus A 200 is 0.5, and the user survival rate of the grouping apparatus B 300 is 0.01.

The survival rate evaluating unit 2604 has a function of obtaining a grouping apparatus ID and a user survival rate from the evaluation result number transmitting unit 3000, a function of obtaining the user survival rate up to the present moment from the user survival rate information storage unit 2602, and a function of storing, to the user survival rate information storage unit 2602, a mean value of the user survival rate up to the present moment and the user survival rate received from the evaluation result number transmitting unit 3000.

The evaluation result number transmitting unit 3000 has a function of obtaining, from the condition evaluation unit 205, user identifiers included in a set of users of a population and user identifiers included in a set of users of a result of grouping process, and has a function of calculating the user survival rate by calculating "the number of user identifiers included in the set of users of the result of the grouping process the number of user identifiers included in the population". In addition, the evaluation result number transmitting unit 3000 has a function of transmitting the calculated user survival rate and the grouping apparatus ID of itself to the survival rate evaluating unit 2604. It should be noted that the grouping apparatus B 300 and the grouping apparatus C 400 also have functions corresponding to the evaluation result number transmitting unit 3000.

Subsequently, operation of the grouping cooperation system according to the second exemplary embodiment of the present invention will be explained. In the present exemplary embodiment, the following processing is performed before the processing of step S3-11 of the condition evaluation unit 205 as illustrated in FIG. 7.

In other words, the condition evaluation unit 205 inputs, into the evaluation result number transmitting unit 3000, a population and a set RESULT which is a list of user identifiers which is obtained by evaluating the individual grouping condition and is determined to match the individual grouping condition. In this example, it is assumed that the population is (user A, user B, user C, user D, user E), and the condition evaluation unit 205 inputs the set RESULT (user A, user B, user C) into the evaluation result number transmitting unit 3000.

The evaluation result number transmitting unit 3000 receives the set of users of the population and the set of users of the result of the grouping process from the condition evaluation unit 205. Then, the user survival rate is calculated by calculating "the number of user identifiers included in the set of users of the result of the grouping process the number of user identifiers included in the population". In this case, the population is (user A, user B, user C, user D, user E), and the set RESULT is (user A, user B, user C). Therefore, 3÷5=0.6 is calculated.

The evaluation result number transmitting unit 3000 transmits the calculated user survival rate and the grouping apparatus ID of itself to the survival rate evaluating unit 2604. The survival rate evaluating unit 2604 receives the grouping apparatus ID and the user survival rate transmitted. In this example, it is assumed that "grouping apparatus A" and "0.6" are received.

The survival rate evaluating unit 2604 looks up the information stored in the user survival rate information storage unit 2602, and obtains the transmitted grouping apparatus ID and the transmitted user survival rate up to the present moment. In this example, it is assumed that the user survival rate information storage unit 2602 stores information as illustrated in FIG. 15 for example, and the survival rate evaluating unit 2604 obtains 0.5 which is the user survival rate of the grouping apparatus A.

Subsequently, the survival rate evaluating unit 2604 calculates a mean value of the user survival rate up to the present moment and the user survival rate received from the evaluation result number transmitting unit 3000, and stores the mean value to the user survival rate information storage unit 2602.

In this example, the user survival rate up to the present moment is 0.5, and the user survival rate received from the evaluation result number transmitting unit 3000 is 0.6. Accordingly, (0.5+0.6)÷2=0.55 is calculated. The survival rate evaluating unit 2604 stores, to the user survival rate information storage unit 2602, information indicating that the grouping apparatus A 200 has a user survival rate of 0.55.

In the present exemplary embodiment, the following processing is performed in place of the processing of steps S5-8, S5-9 performed by the processing flow determining unit 604 as illustrated in FIG. 9.

In other words, the processing flow determining unit 604 receives a grouping apparatus ID, an individual grouping condition, and a population. Then, the processing flow determining unit 604 looks up information stored in the user survival rate information storage unit 2602, and obtains the user survival rate of the grouping apparatus ID. In this example, the processing flow determining unit 604 obtains information indicating that the user survival rate of the grouping apparatus A is 0.55, and the user survival rate of the grouping apparatus B is 0.01.

Then, the processing flow determining unit 604 determines that a grouping apparatus with a lower user survival rate performs processing first. A lower user survival rate means more users reduced in processing performed in the past. In this example, the user survival rate of the grouping apparatus B 300 is less than the user survival rate of the grouping apparatus A 200. Therefore, the processing flow determining unit 604 determines that processing is performed in the following sequence: the grouping apparatus B→the grouping apparatus A.

According to the present exemplary embodiment, information about the record of how many users are reduced by the grouping apparatus is given to a processing flow determining apparatus 600, so that it is possible to predict which grouping apparatus can reduce how many users. Accordingly, a grouping apparatus capable of reducing more users is caused to perform the processing first, and therefore, there is an advantage in that the load of processing of a subsequent grouping apparatus can be reduced.

Third Exemplary Embodiment

Subsequently, the third exemplary embodiment of the present invention will be explained. The present exemplary embodiment is characterized in that a processing flow is not determined on the basis of the order of priority determined in advance. Instead, information stored in the provider storage unit 2606 is looked up, and for each piece of user information, a leakage damage degree at leakage is calculated according to the number of providers holding it, and then, the grouping apparatus holding user information of which leakage damage degree is low preferentially performs processing.

Figure 16:
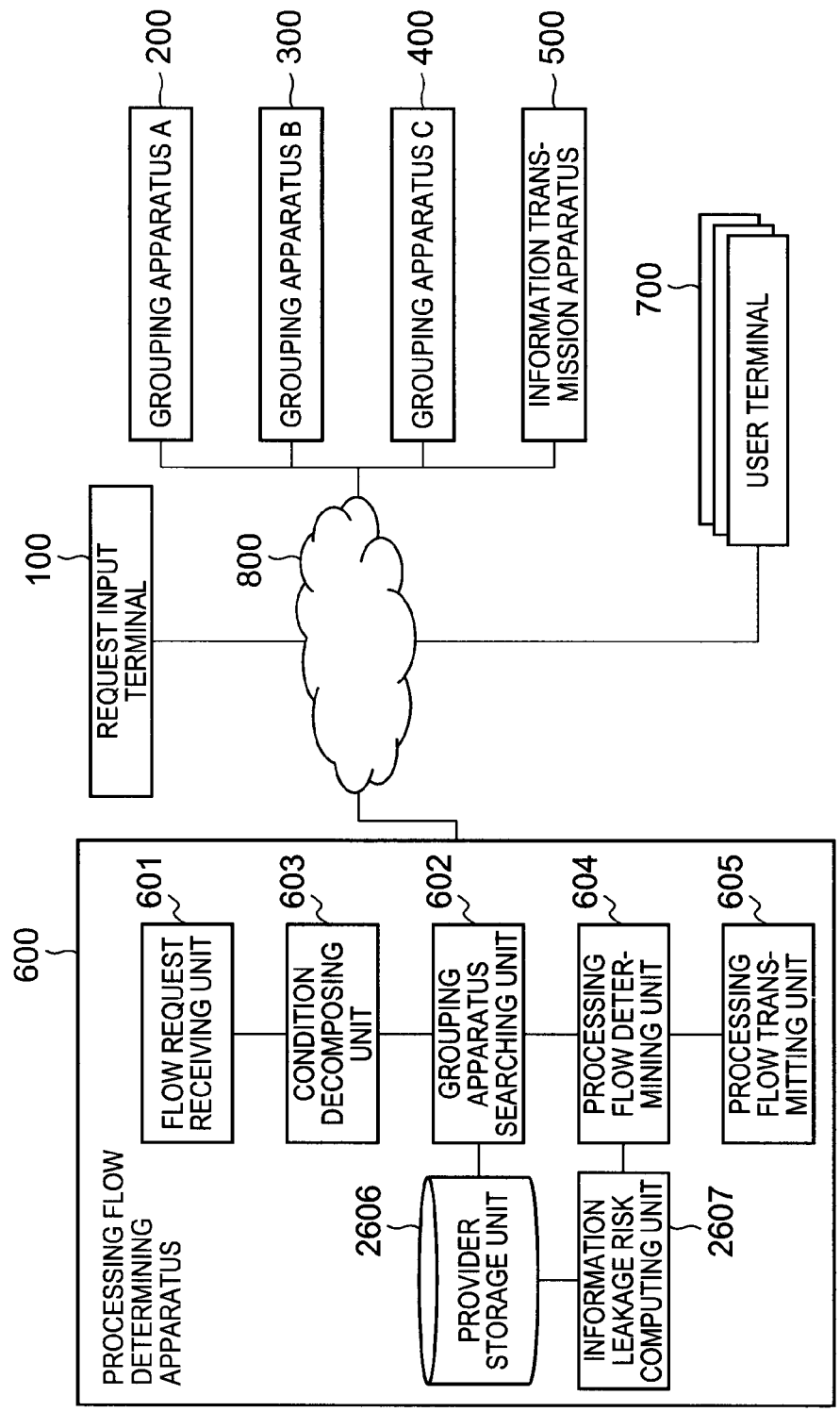
FIG. 16 is a block diagram illustrating an example of configuration of a third exemplary embodiment of a grouping cooperation system according to the present invention.

FIG. 16 is a block diagram illustrating an example of configuration of the third exemplary embodiment of a grouping cooperation system according to the present invention. As illustrated in FIG. 16, in the grouping cooperation system according to the third exemplary embodiment of the present invention, a processing flow determining apparatus 600 includes not only the constituent elements provided in the processing flow determining apparatus 600 according to the first exemplary embodiment as illustrated in FIG. 1 but also an information leakage risk computing unit 2607.

The provider storage unit 2606 saves information indicating which grouping apparatus holds user information for each type of user information. FIG. 17 is an explanatory diagram illustrating an example of information stored in the provider storage unit 2606.

In the example as illustrated in FIG. 17, the provider storage unit 2606 stores information indicating that user information "age" is held in a grouping apparatus A 200, grouping apparatus B 300, and a grouping apparatus C400, user information "position" is held in a grouping apparatus D and a grouping apparatus E, and user information "annual income" is held by grouping apparatus F.

The information leakage risk computing unit 2607 has a function of receiving the type of user information from the processing flow determining unit 604, a function of looking up information stored in the provider storage unit 2606 and calculating a leakage damage degree which is a degree of damage that occurs when a certain type of user information is leaked, and a function of inputting the calculated leakage damage degree into the processing flow determining unit 604.

The information leakage risk computing unit 2607 calculates the leakage damage degree on the basis of the number of grouping apparatuses holding the type of user information specified. When there are many grouping apparatuses holding the user information, that user information is considered to be generally-available user information, and therefore, the leakage damage degree is considered to be low. For example, user information such as age and sex are likely to be registered to many service providers, and therefore, the information such as age and sex is generally-available information, and the leakage damage degree thereof is considered to be low.

Subsequently, operation of the grouping cooperation system according to the second exemplary embodiment of the present invention will be explained. In the present exemplary embodiment, the following processing is executed in place of the processing of steps S5-8 to S5-10 performed by the processing flow determining unit 604 as illustrated in FIG. 9.

In other words, the processing flow determining unit 604 receives a grouping apparatus ID, an individual grouping condition, and a population. Then the processing flow determining unit 604 inputs the type of user information included in the individual grouping condition of each individual grouping condition into the information leakage risk computing unit 2607, and requests the information leakage risk computing unit 2607 to calculate the leakage damage degree when that type of user information is leaked. In this example, it is assumed that the processing flow determining unit 604 receives the individual grouping condition, i.e., {(grouping apparatus A, "age=10 to 19 years old"), (grouping apparatus B, "position=Tamachi")}, and inputs the type of user information, i.e., age and position, into the information leakage risk computing unit 2607.

The information leakage risk computing unit 2607 receives the type of user information, looks up information stored in the provider storage unit 2606, and calculates the leakage damage degree. The leakage damage degree is calculated by obtaining a reciprocal number of the number of grouping apparatuses holding the received type of user information.

In this example, the provider storage unit 2606 saves information as illustrated in FIG. 17 for example, and there are three grouping apparatuses holding the age information, i.e., the grouping apparatus A 200, the grouping apparatus B 300, and the grouping apparatus C400. Therefore, the information leakage risk computing unit 2607 calculates that the leakage damage degree of age is about 0.33. Likewise, there are two grouping apparatuses holding the position information, and accordingly, the information leakage risk computing unit 2607 calculates that the leakage damage degree is 0.5.

The information leakage risk computing unit 2607 inputs the calculated leakage damage degree into the processing flow determining unit 604. In this example, it is assumed that information (age, 0.33), (position, 0.5) is input.

The processing flow determining unit 604 receives the leakage damage degree from the information leakage risk computing unit 2607, and determines that processing is performed preferentially performed by a grouping apparatus holding user information of which leakage damage degree is low. In this example, the leakage damage degree of age is lower than the leakage damage degree of position, and therefore, the processing flow determining unit 604 determines that the grouping apparatus A 200 holding user information about age is caused to execute processing first, and thereafter, the grouping apparatus D is caused to execute processing.

According to the present exemplary embodiment, processing of the grouping apparatus holding user information causing less damage at the time of leakage of the user information can be performed first, and therefore, even if the user information is leaked, the damage can be reduced to the lower degree.

Fourth Exemplary Embodiment

Subsequently, the fourth exemplary embodiment of the present invention will be explained. The present exemplary embodiment is characterized in that a confirmation is made whether an apparatus serving as an input source of a population an individual grouping set and an apparatus serving as an output destination are the same apparatus.

In each exemplary embodiment explained above, when both of a population and users obtained as a result of grouping process are known, it is possible to infer user information held by a grouping apparatus executing the processing of grouping.

More specifically, for example, when a population includes user 1 to user 100, and users obtained as a result of grouping process are user 1 to user 50, it is possible to infer as follows. When both of the population and the users obtained as a result of the grouping process are known, it is possible to infer that user information held by a grouping apparatus having executed the processing of grouping are information that matches half of the population. Moreover, it is possible to infer that the user information that matches half of the population is sex. In general, user information such as age and position is considered less likely to match half of the population. Therefore, the user information held by the grouping apparatus having executed the processing of grouping may be inferred.

Further, when it is known that user 1 is male and user 51 is female, it may be inferred that user 1 to user 50 are male, and user 51 to user 100 are female. In other words, when both of the population and the users obtained as a result of the grouping process are known, it is possible to infer user information about the population and the users obtained as a result of the grouping process.

When both of an individual grouping condition and users obtained as a result of grouping process are known, it is possible to infer user information about the users obtained as a result of the grouping process.

More specifically, for example, when the individual grouping condition is "sex=male", and the users obtained as a result of the grouping process is user A, it is possible to infer as follows. When the individual grouping condition and the user A obtained as a result of the grouping process are known, it is possible to infer that the user A is male.

Accordingly, the grouping cooperation system according to the present exemplary embodiment has a configuration to prevent the same provider and the like from knowing the individual grouping condition and the users obtained as a result of the grouping process and prevent the same provider and the like from knowing the population and the users obtained as a result of the grouping process.

Figure 18:
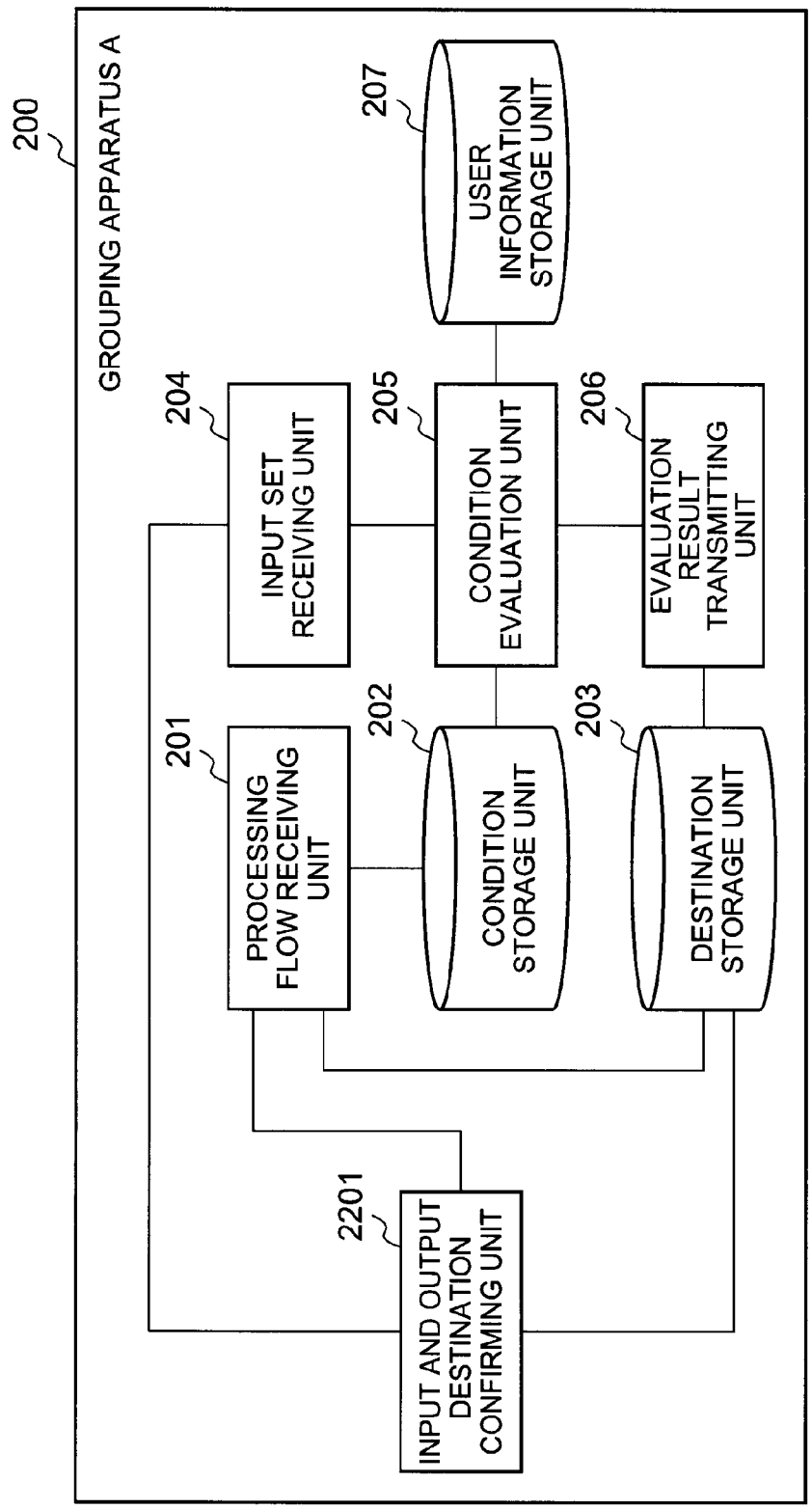
FIG. 18 is a block diagram illustrating an example of configuration of a fourth exemplary embodiment of a grouping cooperation system according to the present invention.

FIG. 18 is a block diagram illustrating an example of configuration of the fourth exemplary embodiment of a grouping cooperation system according to the present invention. As illustrated in FIG. 18, in the grouping cooperation system according to the fourth exemplary embodiment of the present invention, a grouping apparatus A 200 includes not only the constituent elements provided in the grouping apparatus A 200 according to the first exemplary embodiment as illustrated in FIG. 1 but also an input and output destination confirming unit 2201.

The input and output destination confirming unit 2201 has a function of obtaining information about an identifier of a transmission source of a population received as input from an input set receiving unit 204, a function of obtaining information about an identifier of a transmission source of an individual grouping condition received as input from a processing flow receiving unit 201, a function of looking up information stored in a destination storage unit 203 and obtaining an identifier indicating a destination, and a function of confirming that the identifier of the transmission source of the population and the identifier of the transmission source of the individual grouping condition are different from the identifier indicating the destination.

Subsequently, operation of the grouping cooperation system according to the fourth exemplary embodiment of the present invention will be explained. In the present exemplary embodiment, the following processing is performed before the processing of step S3-5 of the input set receiving unit 204 as illustrated in FIG. 7.

In other words, the input set receiving unit 204 transmits, to the input and output destination confirming unit 2201, the identifier of the transmission source of the population received as input. Then, the input and output destination confirming unit 2201 is requested to confirm whether there is any problem in the transmission source and the destination.

The input and output destination confirming unit 2201 obtains the identifier of the transmission source of the individual grouping condition received as input from the processing flow receiving unit 201.

The input and output destination confirming unit 2201 looks up information stored in the destination storage unit 203, and obtains the identifier indicating the destination.

The input and output destination confirming unit 2201 confirms whether the identifier of the transmission source of the population and the identifier of the transmission source of the individual grouping condition are different from the identifier indicating the destination, and inputs the result into the input set receiving unit 204.

In this example, it is assumed that the identifier of the transmission source of the population is "request input terminal", the identifier of the transmission source of the individual grouping condition is "request input terminal", and the identifier indicating the destination is "grouping apparatus B". In this case, the identifier of the transmission source of the population is different from the identifier indicating the destination. The identifier of the transmission source of the individual grouping condition is also different from the identifier indicating the destination. Therefore, the input and output destination confirming unit 2201 inputs a result indicating that there is no problem into the input set receiving unit 204.

The input set receiving unit 204 receives the result from the input and output destination confirming unit 2201. When the result indicates that there is a problem, the input set receiving unit 204 stops subsequent processing. When the result indicates that there is no problem, the input set receiving unit 204 executes processing of step S3-5.

According to the present exemplary embodiment, the problem of inference of the user information from the population or the individual grouping condition and the grouping result can be prevented in advance.

It should be noted that there may be a case where a provider managing the processing flow determining apparatus 600 maliciously determines a processing flow which allows inference of user information held in a grouping apparatus. In order to cope with such case, the present exemplary embodiment is configured, as a measure of self-defense, to make it difficult for a provider managing a grouping apparatus to infer user information.

Fifth Exemplary Embodiment

Subsequently, the fifth exemplary embodiment of the present invention will be explained. The present exemplary embodiment is characterized in determining a processing flow by combining a plurality of indexes such as a user remaining rate according to the type of user information, which corresponds to the user survival rate of the grouping apparatus explained in the second exemplary embodiment, and an information leakage risk value, which corresponds to the leakage damage degree explained in the third exemplary embodiment.

Figure 19:
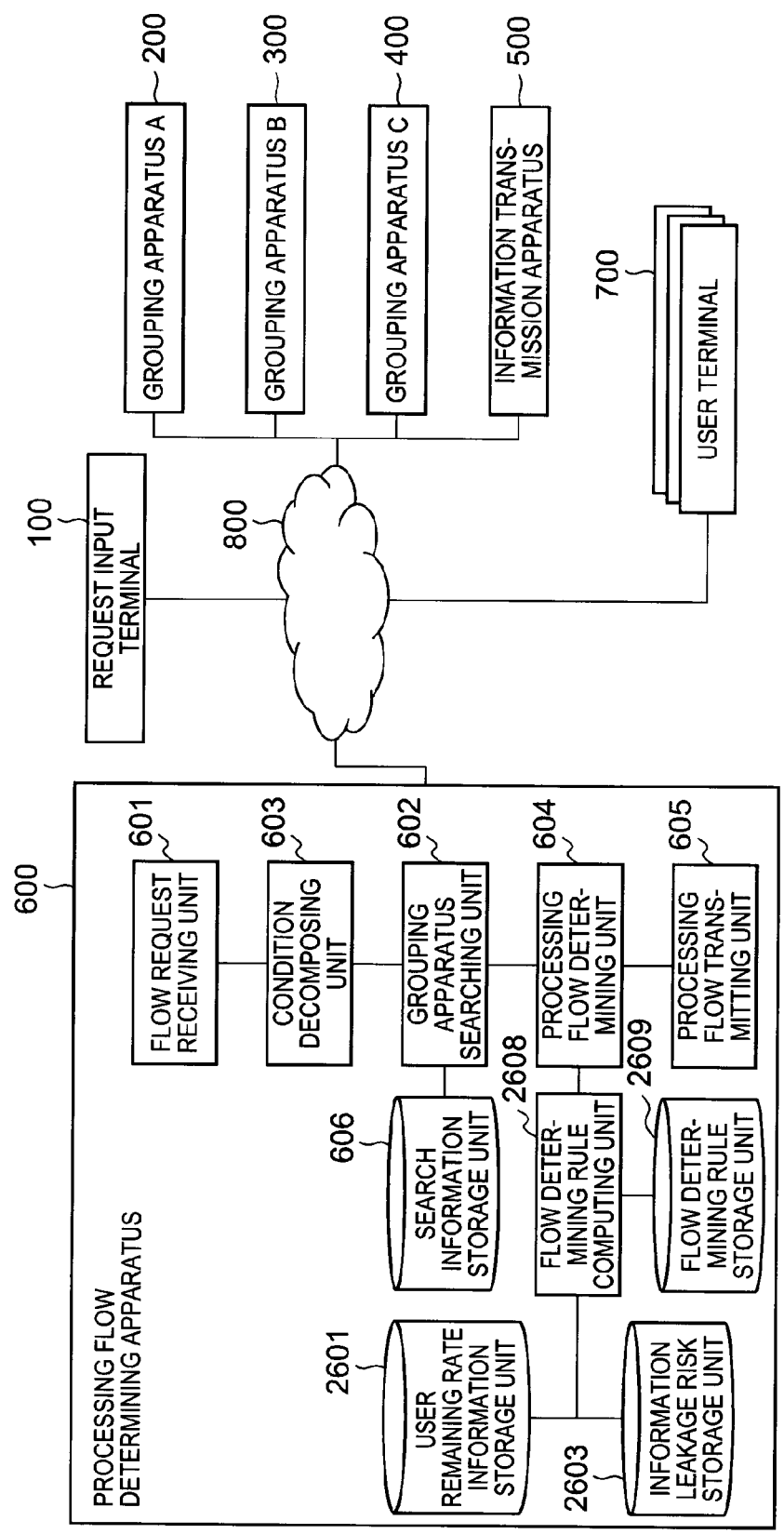
FIG. 19 is a block diagram illustrating an example of configuration of a fifth exemplary embodiment of a grouping cooperation system according to the present invention.

FIG. 19 is a block diagram illustrating an example of configuration of the fifth exemplary embodiment of a grouping cooperation system according to the present invention. As illustrated in FIG. 19, in the grouping cooperation system according to the fifth exemplary embodiment of the present invention, a processing flow determining apparatus 600 includes not only the constituent elements provided in the processing flow determining apparatus 600 according to the first exemplary embodiment as illustrated in FIG. 1 but also a flow determining rule computing unit 2608, a flow determining rule storage unit 2609, a user remaining rate information storage unit 2601, and an information leakage risk storage unit 2603.

The flow determining rule storage unit 2609 associates and stores index calculation formulas each indicating how a value serving as an index for determining a processing flow is calculated and weighting values for adding up values calculated using the index calculation formula.

FIG. 20 is an explanatory diagram illustrating an example of information stored in the flow determining rule storage unit 2609. In the example as illustrated in FIG. 20, a weight "2" is associated and stored with an index calculation formula "1/user remaining rate". In the example as illustrated in FIG. 20, a weight "1" is associated and stored with an index calculation formula "information leakage risk value×(−1)".

The information leakage risk storage unit 2603 associates and stores the type of user information and the value of the information leakage risk indicating the degree of damage where information is leaked.

FIG. 21 is an explanatory diagram illustrating an example of information stored in the information leakage risk storage unit 2603. In the example as illustrated in FIG. 21, a value of the information leakage risk "2" is associated and stored with the type of user information "age", a value of the information leakage risk "1" is associated and stored with the type of user information "sex", and a value of the information leakage risk "100" is associated and stored with the type of user information "annual income".

The flow determining rule computing unit 2608 has a function of obtaining a plurality of individual grouping conditions from the processing flow determining unit 604, a function of looking up information stored in the flow determining rule storage unit 2609 and obtaining all the index calculation formulas, a function of obtaining various kinds of indexes from the information leakage risk storage unit 2603 and the user remaining rate information storage unit 2601 storing information which is to be used for the index calculation formulas, a function of calculating an index calculation formula using various kinds of indexes obtained, and a function of inputting, into the processing flow determining unit 604, a result of value obtained by adding up the values calculated with the index calculation formulas.

The user remaining rate information storage unit 2601 associates and saves the type of user information and the value of the user remaining rate indicating the index according to how many users can be reduced. The user remaining rate is, for example, a ratio indicating how many users remain as a result of grouping process using a certain type of user information. More specifically, for example, when users in the population are user 1 to user 100, and users in a set obtained as a result of grouping process with a certain age are user 1 to user 10, the user remaining rate is 0.1, which is calculated as follows: 10/100. When users in a set obtained as a result of grouping process with sex are user 1 to user 50, the user remaining rate is 0.5, which is calculated as follows: 50/100. When users in a set obtained as a result of grouping process with a certain annual income or more are user 1 to user 5, the user remaining rate is 0.05, which is calculated as follows: 5/100.

FIG. 22 is an explanatory diagram illustrating an example of information stored in the user remaining rate information storage unit 2601. In the example as illustrated in FIG. 22, a user remaining rate "0.1" is associated and stored with the type of user information "age", a user remaining rate "0.5" is associated and stored with the type of user information "sex", and a user remaining rate "0.05" is associated and stored with the type of user information "annual income".

Subsequently, operation of the grouping cooperation system according to the fifth exemplary embodiment of the present invention will be explained. In the present exemplary embodiment, the following processing is executed in place of the processing of steps S5-8 to S5-10 performed by the processing flow determining unit 604 as illustrated in FIG. 9.

In other words, the processing flow determining unit 604 receives a grouping apparatus ID, an individual grouping condition, and a population from the grouping apparatus searching unit 602. Then, the processing flow determining unit 604 inputs an individual grouping condition into the flow determining rule computing unit 2608, and requests the flow determining rule computing unit 2608 to obtain the order of priority of grouping apparatuses required to determine a processing flow. In this example, the processing flow determining unit 604 inputs, into the flow determining rule computing unit 2608, information of "a list of a combination of a grouping apparatus ID and an individual grouping condition, i.e., {(grouping apparatus A, "age=10 to 19 years old"), (grouping apparatus B, "position=Tamachi")}

The flow determining rule computing unit 2608 obtains a plurality of individual grouping conditions from the processing flow determining unit 604. Then, the flow determining rule computing unit 2608 looks up information stored in the flow determining rule storage unit 2609 as illustrated in FIG.

20 for example, and obtains all the index calculation formulas. In this example, it is assumed that the flow determining rule computing unit 2608 obtains an index calculation formula "1/user remaining rate" and an index calculation formula "information leakage risk value×(−1)".

Then, the flow determining rule computing unit 2608 obtains various kinds of indexes from the user remaining rate information storage unit 2602 and the information leakage risk storage unit 2603 in order to calculate the obtained index calculation formulas. In this example, flow determining rule computing unit 2608 obtains indexes of age and sex. More specifically, the flow determining rule computing unit 2608 obtains information indicating the information leakage risk of age is 2, the information leakage risk of sex is 1, the user remaining rate of age is 0.1, and the user remaining rate of sex is 0.5.

Then, the flow determining rule computing unit 2608 calculates the priority, which is a summation of results calculated with the index calculation formulas for the respective types of user information, on the basis of the various kinds of indexes obtained. In this example, values of various kinds of indexes are substituted into "1/user remaining rate" and "information leakage risk value×(−1)", which are multiplied by weighting values, and then a summation thereof is calculated. The calculation result with regard to the user information "age" is as follows: ((1/0.1)×2)+(2×(−1)×1)=18. The calculation result with regard to the user information "sex" is as follows: ((1/0.5)×2)+(1×(−1)×1)=9.

Then, flow determining rule computing unit 2608 inputs, into the processing flow determining unit 604, the priority which is the calculation result using the index calculation formula.

The processing flow determining unit 604 determines the sequence of grouping apparatuses executing processing, in accordance with the priority obtained from the flow determining rule computing unit 2608. In this example, the priority of age is 18, and the priority of sex is 9, and therefore, the priority of age is higher than the priority of sex. Accordingly, the processing flow determining unit 604 determines that the grouping apparatus A 200 executes processing first, and thereafter, the grouping apparatus B 300 executes processing. It is assumed that the user information "age" is held by the grouping apparatus A 200, and the user information "sex" is held by the grouping apparatus B 300.

According to the present exemplary embodiment, a processing flow can be determined by combining a plurality of indexes such as the user remaining rate and the information leakage risk.

As illustrated in FIG. 22 for example, the user remaining rate information storage unit 2602 according to the present exemplary embodiment stores the user remaining rate in association with the type of user information. However, the user remaining rate information storage unit 2602 may store the user remaining rate in association with the type of user information and the value of user information. For example, the user remaining rate information storage unit 2602 may store a user remaining rate "0.1" in association with the type of user information "age" and the value of user information "20 to 29 years old".

Further, the flow determining rule computing unit 2608 may be configured to obtain the user remaining rate associated with the type of user information and the value of user information from the user remaining rate information storage unit 2602, and may perform index calculation.

In such configuration, the user remaining rate information storage unit 2602 can store the user remaining rate with a higher precision than the user remaining rate associated with only the type of user information. For example, sometimes, the type of user information "age" may be result in a different user remaining rate according to ages. In such case, when the user remaining rate information storage unit 2602 stores a user remaining rate according to the type of user information "age" and the value of the user information "20 to 29 years old", an index calculation result with a higher precision can be calculated as compared with a case where the user remaining rate information storage unit 2602 stores a user remaining rate according to only the type of user information "age".

Figure 23:
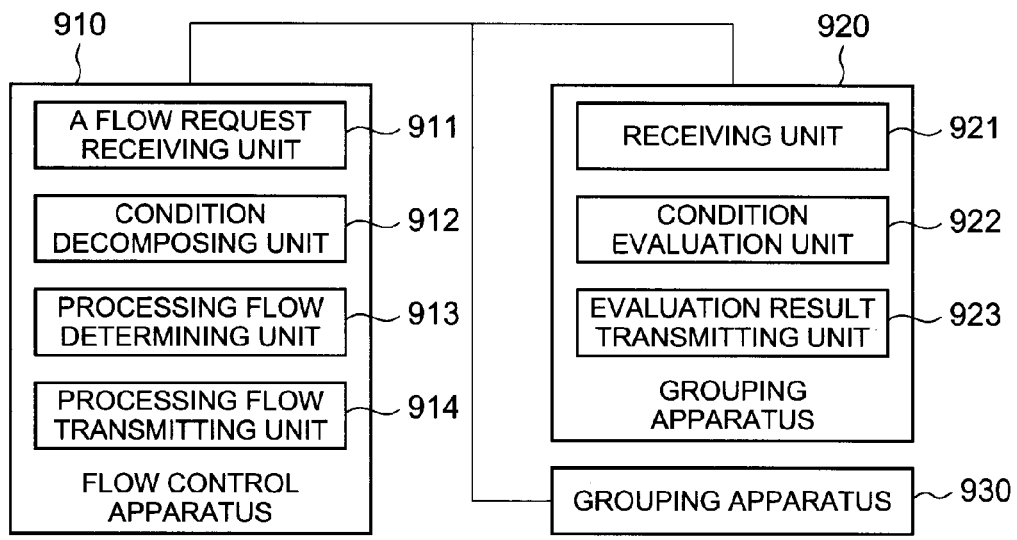
FIG. 23 is a block diagram illustrating overview of the present invention.
Figure 24:
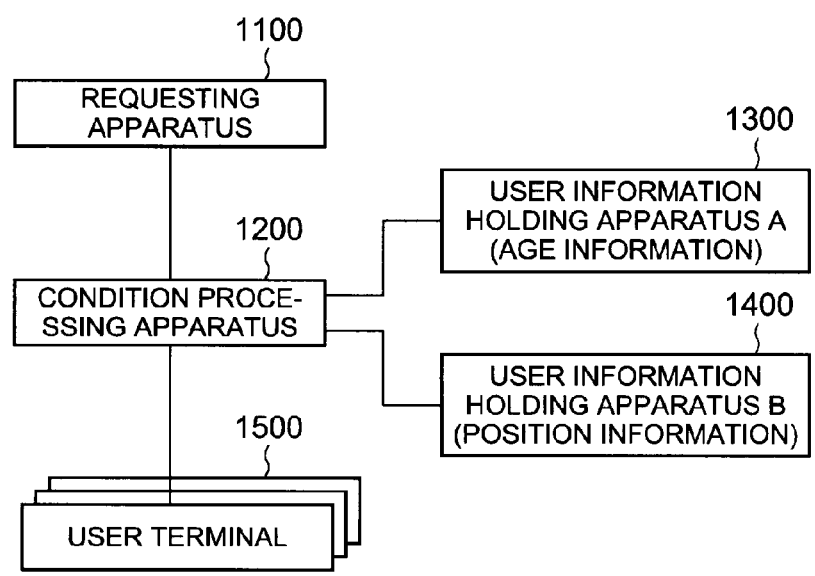
FIG. 24 is a block diagram illustrating an example of configuration of a generally-available grouping system for extracting users on the basis of user information managed by a plurality of providers.

Subsequently, overview of the present invention will be explained. FIG. 23 is a block diagram illustrating overview of the present invention. The grouping cooperation system according to the present invention includes a flow control apparatus 910 and a plurality of grouping apparatuses 920, 930.

The flow control apparatus 910 (corresponding to the processing flow determining apparatus 600 as illustrated in FIG. 1) includes a flow request receiving unit 911 (corresponding to the flow request receiving unit 601 as illustrated in FIG. 1), a condition decomposing unit 912 (corresponding to the condition decomposing unit 603 as illustrated in FIG. 1), a processing flow determining unit 913 (corresponding to the processing flow determining unit 604 as illustrated in FIG. 1), and a processing flow transmitting unit 914 (corresponding to the processing flow transmitting unit 605 as illustrated in FIG. 1).

The grouping apparatus 920 (corresponding to the grouping apparatus A 200 as illustrated in FIG. 1) includes a receiving unit 921 (corresponding to the processing flow receiving unit 210 and the input set receiving unit 204 as illustrated in FIG. 1), a condition evaluation unit 922 (corresponding to the condition evaluation unit 205 as illustrated in FIG. 1), and an evaluation result transmitting unit 923 (corresponding to the evaluation result transmitting unit 206 as illustrated in FIG. 1).

The grouping apparatuses 920, 930 manages user information which is information about users, and executes grouping processing for extracting a subset, which matches a predetermined condition, from a set of users. The flow control apparatus 910 transmits a set of users, which are subjected to the grouping processing, to a grouping apparatus 920, which is one of a plurality of grouping apparatuses 920, 930, and transmits a condition used for grouping processing to each of the plurality of grouping apparatuses 920, 930.

The grouping apparatus 920 transmits, to another grouping apparatus 930, a first subset extracted by executing grouping processing on the set transmitted from the flow control apparatus 910. The another grouping apparatus 930 executes grouping processing on the first subset transmitted from the grouping apparatus 920, thereby extracting a second subset.

The flow request receiving unit 911 receives a set of users and a basic grouping condition constituted by a plurality of conditions for extracting users from the set of users. The condition decomposing unit 912 decomposes the plurality of conditions, which constitutes the basic grouping condition which are input to the flow request receiving unit 911, into individual grouping conditions, i.e., conditions corresponding to the types of user information.

The processing flow determining unit 913 determines a sequence the grouping processing is executed by the plurality of grouping apparatuses 920, 930. The processing flow transmitting unit 914 transmits a set of users to one of the grouping apparatuses, i.e., the grouping apparatus 920, on the basis of the sequence determined by the processing flow determining unit 913, and transmits, to each of the grouping apparatuses 920, 930, an individual grouping condition decomposed by the condition decomposing unit 912 and destination information indicating a destination of a subset which is a result of grouping processing performed by each of the grouping apparatuses 920, 930 based on the sequence determined by the processing flow determining unit 913.

The receiving unit 921 receives the individual grouping condition and the destination information transmitted from the flow control apparatus 910 and the set or subset of users transmitted from the flow control apparatus 910 or another grouping apparatus. The condition evaluation unit 922 extracts, on the basis of the managed user information, a subset including users that matches the individual grouping condition received by the receiving unit 921 from the users included in the set or subset of users received by the receiving unit 921.

The evaluation result transmitting unit 923 transmits the subset extracted by the condition evaluation unit 922 to the destination indicated by the destination information received by the receiving unit 921.

In such configuration, the risk of leakage of user information can be reduced. This is because the grouping processing can be performed without transmitting user information managed by the grouping apparatus 920 to another grouping apparatus 930. In other words, it is not necessary to give the user information to the other grouping apparatus 930, and therefore, this reduces the risk of leakage of the user information, which is caused by illegal activity committed by the provider of the grouping apparatus 930 in transmission/reception path of the user information or at the destination of transmission of the user information.

The apparatus that inputs the set of user identifiers and the condition serving as input to the grouping apparatus 920, 930 is different from the apparatus that receives the set of user identifiers serving as output from the grouping apparatuses 920, 930. Therefore, it is difficult to infer user information from the input to the grouping apparatuses 920, 930 and the output from the grouping apparatuses 920, 930.

In each of the exemplary embodiments explained above, a grouping cooperation system as shown in the following items (1) to (4) is also disclosed.

(1) A grouping cooperation system, wherein the flow control apparatus 910 includes a user survival rate information storage unit which associates and stores a user survival rate, which is a ratio of a number of users extracted in the grouping processing based on the individual grouping condition according to a type of user information managed by each of the grouping apparatuses 920, 930 from users included in a set received by each of the grouping apparatuses 920, 930, and the type of user information, and wherein the processing flow determining unit 913 obtains, from the user survival rate information storage unit, the user survival rate associated with the type of user information corresponding to the individual grouping condition, and determines a sequence the grouping apparatuses 920, 930 execute the grouping processing, on the basis of the user survival rate.

(2) A grouping cooperation system, wherein the flow control apparatus 910 includes an information leakage risk degree computing unit which calculates a information leakage risk degree indicating a degree of magnitude of damage where user information is leaked according to a type of user information, and wherein the processing flow determining unit 913 determines a sequence the grouping apparatuses execute the grouping processing, on the basis of the information leakage risk degree calculated by the information leakage risk degree computing unit.

(3) A grouping cooperation system, wherein the flow control apparatus 910 includes a flow determining rule storage unit which stores a plurality of index calculation formulas which are calculation formulas for determining the sequence the grouping apparatuses 920, 930 execute the grouping processing, and a flow determining rule computing unit which calculates the plurality of index calculation formulas stored in the flow determining rule storage unit, thereby obtaining a calculation result of each of the index calculation formulas, wherein the processing flow determining unit 913 determines a sequence the grouping apparatuses 920, 930 execute the grouping processing, on the basis of the calculation result of the flow determining rule computing unit.

(4) A grouping cooperation system, wherein the grouping apparatus 920 includes an input and output destination confirming unit which confirms whether a transmission source from which the set of a plurality of users is received by the receiving unit 921 and a transmission source from which the individual grouping information is received by the receiving unit 921 are different from a destination indicated by the destination information received by the receiving unit 921, wherein the receiving unit 921 inputs the received set into the condition evaluation unit 922 in accordance with a confirmation result of the input and output destination confirming unit.

The invention of the present application has been hereinabove explained with reference to the exemplary embodiments and examples, but the invention of the present application is not limited to the exemplary embodiments and examples explained above. In the configuration and details of the invention of the present application, various changes which can be understood by a person skilled in the art can be made within the scope of the invention of the present application.

This applications claims priority based on Japanese Patent Application No. 2009-294761 filed on Dec. 25, 2009, and all the disclosure thereof is incorporated herein.

INDUSTRIAL APPLICABILITY

The present invention can be applied to usage such as distribution service of advertisement messages where user information possessed by a web service provider and user information possessed by a communication service provider are used in cooperation. In addition to the web service provider and the communication service provider, providers having user information such as various kinds of retail stores and medical institutions can also take part in cooperation. In addition to advertisement distribution, the present invention can also be applied to usage such as news distribution and train delay notification service.

(Supplementary Note 1)

A grouping processing flow management program for causing a computer to execute condition decomposing processing for decomposing a plurality of conditions, which constitutes a basic grouping condition constituted by a plurality of conditions for extracting users from a set of users, into individual grouping conditions, which are conditions corresponding to types of user information, processing flow determining processing for determining a sequence in which grouping processing is executed by a plurality of grouping apparatuses executing the grouping processing for extracting users, which match the individual grouping condition, from a set of users, and processing flow transmitting processing for transmitting a set of users to one of the grouping apparatuses on the basis of the sequence determined in the processing flow determining, and transmitting, to each of the grouping apparatuses, the individual grouping condition decomposed in the condition decomposing processing and destination information indicating a destination of a subset which is a result of grouping processing performed by each of the grouping apparatuses based on the sequence determined in the processing flow determining processing.

(Supplementary Note 2)

The grouping processing flow management program according to Appendix 1, wherein the grouping processing flow management program causes the computer to, in the processing flow determining processing, obtain a user survival rate associated with a type of user information corresponding to an individual grouping condition from a user survival rate information storage unit which associates and saves the user survival rate, which is a ratio of a number of users extracted in the grouping processing based on the individual grouping condition according to the type of user information managed by each of the grouping apparatuses from users included in a set received by each of the grouping apparatuses, and the type of user information, and to determine a sequence the grouping apparatuses execute the grouping processing, on the basis of the user survival rate.

REFERENCE SIGNS LIST

100 Request input terminal
200 Grouping apparatus A
201 Processing flow receiving unit
202 Condition storage unit
203 Destination storage unit
204 Input set receiving unit
205 Condition evaluation unit
206 Evaluation result transmitting unit
207 User information storage unit
300 Grouping apparatus B
400 Grouping apparatus C
500 Information transmission apparatus
600 Processing flow determining apparatus
601 Flow request receiving unit
602 Grouping apparatus searching unit
603 Condition decomposing unit
604 Processing flow determining unit
605 Processing flow transmitting unit
606 Search information storage unit
607 Priority degree storage unit
700 User terminal
800 Communication network
2201 Input and output destination confirming unit
2602 User remaining rate information storage unit
2602 User survival rate information storage unit
2603 Information leakage risk Storing unit
2604 Surviving rate evaluating unit
2606 Provider storing unit
2607 Information leakage risk computing unit
2608 Flow determining rule computing unit
2609 Flow determining rule storage unit
3000 Evaluation result number transmitting unit

The invention claimed is:

1. A grouping cooperation system comprising:
a plurality of grouping apparatuses, wherein each of the grouping apparatuses manages user information which is information about users, and executes grouping processing for extracting a set, which matches a predetermined condition, from a set of users;
a flow control apparatus which transmits a condition used in the grouping processing to each of the plurality of grouping apparatuses,
wherein the one of the grouping apparatuses transmits, to another grouping apparatus, a first set extracted by executing the grouping processing on the set transmitted from the flow control apparatus,
the other grouping apparatus extracts a second set by executing the grouping processing on the first set transmitted from the one of the grouping apparatuses,
wherein the flow control apparatus includes:
a flow request receiving unit which receives a basic grouping condition constituted by a plurality of conditions for extracting users from the set of users;
a condition decomposing unit which decomposes the plurality of conditions, which constitutes the basic grouping condition which are input to the flow request receiving unit, into individual grouping conditions, which are conditions corresponding to types of user information;
a processing flow determining unit which determines a sequence the grouping processing is executed by the plurality of grouping apparatuses;
a processing flow transmitting unit which transmits, to each of the grouping apparatuses, the individual grouping condition and destination information indicating a destination of a set which is a result of grouping processing performed by each of the grouping apparatuses based on the sequence determined by the processing flow determining unit; and
a user survival rate information storage unit which associates and stores a user survival rate, which is a ratio of a number of users extracted in the grouping processing based on the individual grouping condition according to a type of user information managed by each of the grouping apparatuses from users included in a set received by each of the grouping apparatuses, and the type of user information,
wherein the grouping apparatus includes:
a receiving unit which receives the individual grouping condition and the destination information transmitted from the flow control apparatus and the set transmitted from the flow control apparatus or another grouping apparatus;
a condition evaluation unit which extracts, on the basis of the managed user information, a set including users that matches the individual grouping condition received by the receiving unit from the users included in the set or users or set received by the receiving unit; and
an evaluation result transmitting unit which transmits the set extracted by the condition evaluation unit to the destination indicated by the destination information received by the receiving unit,
and wherein the processing flow determining unit determines the sequence the grouping apparatuses execute the grouping processing, on the basis of the user survival rate.

2. The grouping cooperation system according to claim 1, wherein the flow control apparatus includes an information leakage risk degree computing unit which calculates a information leakage risk degree indicating a degree of magnitude of damage where user information is leaked according to a type of user information, and
wherein the processing flow determining unit determines a sequence the grouping apparatuses execute the grouping processing, on the basis of the information leakage risk degree calculated by the information leakage risk degree computing unit.

3. The grouping cooperation system according to claim 1, wherein the flow control apparatus includes:

a flow determining rule storage unit which stores a plurality of index calculation formulas which are calculation formulas for determining the sequence the grouping apparatuses execute the grouping processing; and a flow determining rule computing unit which calculates the plurality of index calculation formulas stored in the flow determining rule storage unit, thereby obtaining a calculation result of each of the index calculation formulas, wherein the processing flow determining unit determines a sequence the grouping apparatuses execute the grouping processing, on the basis of the calculation result of the flow determining rule computing unit.

4. The grouping cooperation system according to claim 1, wherein the grouping apparatus includes an input and output destination confirming unit which confirms whether a transmission source from which the set of a plurality of users is received by the receiving unit and a transmission source from which the individual grouping information is received by the receiving unit are different from a destination indicated by the destination information received by the receiving unit, wherein the receiving unit inputs the received set into the condition evaluation unit in accordance with a confirmation result of the input and output destination confirming unit.

5. A grouping cooperation method implemented in a flow control apparatus, comprising:

receiving, by the flow control apparatus, a basic grouping condition constituted by a plurality of conditions for extracting users from the set of users;

decomposing, by the flow control apparatus, the plurality of conditions, which constitutes the basic grouping condition which are received, into individual grouping conditions, which are conditions corresponding to types of user information;

determine, by the flow control apparatus, determining a sequence in which grouping processing is executed by the plurality of grouping apparatuses executing the grouping processing for extracting users, which match the individual grouping condition, from the set of users;

transmitting, by the flow control apparatus, to each of the grouping apparatuses, the individual grouping condition and destination information indicating a destination of a set which is a result of grouping processing performed by each of the grouping apparatuses based on the sequence; and associating, by the flow control apparatus, a user survival rate which is a ratio of a number of users extracted in the grouping processing based on the individual grouping condition according to a type of user information managed by each of the grouping apparatuses from users included in a set transmitted to each of the grouping apparatuses, and the type of user information, and storing the user survival rate and the type of user information in a user survival rate information storage unit, wherein the sequence the grouping apparatuses execute the grouping processing is determined on the basis of the user survival rate.

6. The grouping cooperation method according to claim 5, further comprising, calculating a information leakage risk degree indicating a degree of magnitude of damage where user information is leaked according to a type of user information, and wherein sequence is determined on the basis of the information leakage risk degree calculated.

7. The grouping cooperation method according to claim 5, further comprising, storing a plurality of index calculation formulas which are calculation formulas for determining the sequence the grouping apparatuses execute the grouping processing, and calculating the plurality of stored index calculation formulas, thereby obtaining a calculation result of each of the index calculation formulas, and wherein the sequence is determined on the basis of the calculation result.

8. A non-transitory computer readable information recording medium storing flow management program, when executed by a processor, performs a method for, decomposing a plurality of conditions, which constitutes, a basic grouping condition constituted by a plurality of conditions for extracting users from a set of users, into individual grouping conditions, which are conditions corresponding to types of user information;

determining a sequence in which grouping processing is executed by a plurality of grouping apparatuses executing the grouping processing for extracting users, which match the individual grouping condition, from a set of users;

transmitting, to each of the grouping apparatuses, the individual grouping condition decomposed in the condition decomposing processing and destination information indicating a destination of a set which is a result of grouping processing performed by each of the grouping apparatuses based on the sequence determined in the processing flow determining processing; and associating a user survival rate which is a ratio of a number of users extracted in the grouping processing based on the individual grouping condition according to a type of user information managed by each of the grouping apparatuses from users included in a set transmitted to each of the grouping apparatuses, and the type of user information, and storing the user survival rate and the type of user information in user survival rate information storage unit, wherein the sequence the grouping apparatuses execute the grouping processing is determined on the basis of the user survival rate.

9. A flow control apparatus which transmits a condition used in the grouping processing to each of a plurality of grouping apparatuses, which manage user information that is information about users, and execute grouping processing for extracting a set, which matches a predetermined condition, from a set of users:

the flow control apparatus comprising:

a condition decomposing unit which decomposes a plurality of conditions which constitutes a basic grouping condition constituted by a plurality of conditions for extracting users from the set of users into individual grouping conditions which are corresponding to types of user information;

a processing flow determining unit which determines a sequence the grouping processing is executed by the plurality of grouping apparatuses; and a processing flow transmitting unit which transmits, to each of the grouping apparatuses, the individual grouping condition and destination information indicating a destination of a set which is a result of grouping processing performed by each of the grouping apparatuses based on the sequence determined by the processing flow determining unit; and a user survival rate information storage unit which associates and stores a user survival rate, which is a ratio of a number of users extracted in the grouping processing based on the individual grouping condition according to a type of user information managed by each of the grouping apparatuses from users included in a set received by each of the grouping apparatuses, and the type of user information, and wherein the processing flow determining unit determines the sequence the grouping apparatuses execute the grouping processing, on the basis of the user survival rate.

* * * * *